(12) United States Patent
Kuntimaddi et al.

(10) Patent No.: US 7,851,561 B2
(45) Date of Patent: *Dec. 14, 2010

(54) INTERPENETRATING POLYMER NETWORKS USING BLOCKED POLYURETHANE/POLYUREA PREPOLYMERS FOR GOLF BALL LAYERS

(75) Inventors: Manjari Kuntimaddi, Plymouth, MA (US); Shenshen Wu, North Dartmouth, MA (US); Murali Rajagopalan, South Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 138 days.

This patent is subject to a terminal disclaimer.

(21) Appl. No.: 11/976,962

(22) Filed: Oct. 30, 2007

(65) Prior Publication Data

US 2008/0058478 A1    Mar. 6, 2008

Related U.S. Application Data

(60) Division of application No. 10/900,460, filed on Jul. 28, 2004, now Pat. No. 7,288,604, which is a continuation-in-part of application No. 09/833,667, filed on Apr. 13, 2001, now Pat. No. 7,429,220.

(51) Int. Cl.
*A63B 37/12* (2006.01)
*A63B 37/00* (2006.01)
*C08L 75/00* (2006.01)

(52) U.S. Cl. ............... 525/454; 525/124; 525/127; 525/128; 525/131; 525/452; 525/455; 528/45; 528/64; 528/75; 473/371; 473/377; 473/378

(58) Field of Classification Search ............ None
See application file for complete search history.

(56) References Cited

U.S. PATENT DOCUMENTS

| | | | | |
|---|---|---|---|---|
| 4,742,128 | A | 5/1988 | Frisch et al. | 525/424 |
| 5,542,677 | A | 8/1996 | Sullivan et al. | 473/385 |
| 7,339,010 | B2 * | 3/2008 | Kuntimaddi et al. | 525/454 |
| 7,429,220 | B2 | 9/2008 | Kuntimaddi et al. | 473/374 |
| 2002/0187857 | A1 * | 12/2002 | Kuntimaddi et al. | 473/373 |
| 2003/0065124 | A1 * | 4/2003 | Rosenberg et al. | 528/59 |
| 2008/0058478 | A1 | 3/2008 | Kuntimaddi et al. | |
| 2008/0214735 | A1 * | 9/2008 | Kuntimaddi et al. | 525/124 |

FOREIGN PATENT DOCUMENTS

WO    WO 92/12206    7/1992

OTHER PUBLICATIONS

Non-Final Office Action dated Sep. 17, 2009 of corresponding U.S. Appl. No. 12/211,922.
Non-Final Office Action dated Sep. 16, 2009 of corresponding U.S. Appl. No. 12/071,902.
Final Office Action dated Apr. 6, 2010 of corresponding U.S. Appl. No. 12/211,922.
Final Office Action dated May 14, 2010 of corresponding U.S. Appl. No. 12/071,902.

* cited by examiner

*Primary Examiner*—David Buttner
(74) *Attorney, Agent, or Firm*—Hanify & King, P.C.

(57) ABSTRACT

The present invention is directed to a method of forming a golf ball that contains an interpenetrating polymer network, or IPN, which includes at least two polymeric systems, in one or more of the layers. The first polymeric system may include a polyurethane-based or polyurea-based system having blocked isocyanate groups and the second polymeric system may include an epoxy-based or acrylic-based system, wherein the two systems are polymerized or cured simultaneously or sequentially to form an IPN.

9 Claims, 1 Drawing Sheet

INTERPENETRATING POLYMER NETWORKS USING BLOCKED POLYURETHANE/POLYUREA PREPOLYMERS FOR GOLF BALL LAYERS

CROSS-REFERENCE TO RELATED APPLICATIONS

This application is a divisional of U.S. patent application Ser. No. 10/900,460, filed Jul. 28, 2004, now U.S. Pat. No. 7,288,604, which is a continuation-in-part of U.S. patent application Ser. No. 09/833,667, filed on Apr. 13, 2001, now U.S. Pat. No. 7,429,220, which is incorporated by reference herein in its entirety.

FIELD OF THE INVENTION

The present invention is directed to a golf ball that contains an interpenetrating polymer network, or "IPN," formed from at least two chemically different polymeric components intertwined with each other. The IPN includes a blocked polymeric component and its respective curing agent, catalyst, and/or initiator. The method of forming a golf ball containing an IPN of the invention in one or more of golf ball layers is also an aspect of the present invention.

BACKGROUND OF THE INVENTION

Golf balls are formed from a variety of compositions. For example, golf ball covers may be formed from balata, a natural or synthetic trans-polyisoprene rubber, ionomer resins, a durable thermoplastic material, or polyurethanes or polyureas, relatively soft thermoset or thermoplastic materials. Balata covered balls are favored by more highly skilled golfers because the softness of the cover allows the player to achieve spin rates sufficient to more precisely control ball direction and distance, particularly on shorter shots. However, balata covered balls are easily damaged, and thus lack the durability required by the average golfer.

Ionomer resins have more or less replaced balata as a cover material. Chemically, ionomer resins are a copolymer of an olefin and an $\alpha$, $\beta$-ethylenically-unsaturated carboxylic acid having at least a portion of the acid groups neutralized by a metal ion, as disclosed in U.S. Pat. No. 3,264,272. Commercially available ionomer resins include, but are not limited to, SURLYN® from DuPont de Nemours and Company, and ESCOR® and IOTEK® from Exxon Corporation. These ionomer resins are distinguished by the type of metal ion, the amount of acid, and the degree of neutralization. While these ionomers provide extremely durable covers, however, the spin and feel are inferior compared to balata covered balls.

Polyurethanes have also been recognized as useful materials for golf ball covers since about 1960. Polyurethanes are the reaction product of a polyisocyanate and a polyol cured with a hydroxy-terminated or amine-terminated curing agent. U.S. Pat. Nos. 3,147,324, 4,123,061, and 5,334,673 are directed to methods of making golf balls having a polyurethane cover. The resulting golf balls are durable, while at the same time maintaining the softer "feel" of a balata ball. However, golf ball covers made from polyurethane have not, to date, fully matched SURLYN® golf balls with respect to resilience or the rebound of the golf ball cover, which is a function of the initial velocity of a golf ball after impact with a golf club.

Polyureas have also been proposed as cover materials for golf balls. For instance, U.S. Pat. No. 5,484,870 discloses a polyurea composition formed from the reaction product of an organic isocyanate and an organic amine, each having at least two functional groups. Once these two ingredients are combined, the polyurea is formed, and thus the ability to vary the physical properties of the composition is limited. Like polyurethanes, conventional polyureas are not completely comparable to SURLYN® golf balls with respect to resilience or the rebound or damping behavior of the golf ball cover.

In addition, epoxy resins and acrylate resins have been used in golf ball compositions as compatibilizers. For example, WO 92/12206 discloses a resin composition for golf balls formed from a polyester block copolymer and an ionomer resin, and also including an epoxy-containing compound to improve compatibility between the two polymers. The resultant compositions are purported to have improved delamination resistance, flexibility and modulus of resilience, however, the inclusion of such epoxy-containing copolymers increases the melt viscosity of the resin compositions, which makes the compositions unusable for certain molding applications. In addition, U.S. Pat. No. 5,321,089 describes a compatibilizers that contains a small amount of acrylate resins to be used in an ionomer-based golf ball cover composition. The disclosed balls had durability properties superior to balata-covered balls, but inferior to golf balls having covers formed from ionomer blends.

As shown above, the majority of conventional compositions for golf balls have advantages and drawbacks when used in a golf ball layer. As such, golf ball manufacturers are continually searching for compositions that deliver an ideal balance for golfers of all skill levels without sacrificing performance benefits, manufacturing efficiencies, or feel.

Interpenetrating polymer networks, or IPNs, are occasionally used to improve key physical properties or to aid in the compatibilization of the components of a polymer mixture or blend. For example, the use of IPNs may assist in improving durability, e.g., improving fracture toughness and microcracking resistance, and thermal and mechanical performance. Various IPNs are discussed in U.S. Pat. Nos. 5,648,432, 5,210,109, and 4,923,934. For example, U.S. Pat. Nos. 4,128, 600, 4,247,578, and 4,342,793 disclose IPN technology for plastics based on a two-component urethane system polymerized simultaneously with an acrylic monomer. In addition, U.S. Pat. No. 4,923,934 discloses the formation of an IPN from the reaction of a blocked urethane prepolymer, a polyol, and epoxy resin, and an epoxy-catalyzing agent, such as an anhydride for use in coating applications.

Therefore, it would be advantageous to use the IPN concept to form a composition that capitalizes on the favorable properties, but compensates for deficiencies, of individual polymeric systems typically used for golf ball components. In particular, it would be beneficial to use an IPN that utilizes several polymeric components, compatibilizers, and blocking agents in order to achieve a golf ball composition that maximizes beneficial properties and minimizes potential problems. The present invention provides such compositions.

SUMMARY OF THE INVENTION

The present invention relates to an interpenetrating polymer network in a golf ball. In particular, the present invention relates to a method of forming a portion of a golf ball comprising the steps of providing at least a first polymeric component and a second polymeric component, each polymeric component comprising at least one monomer, oligomer, prepolymer, or a combination thereof; sufficiently polymerizing each polymeric component sequentially or simultaneously to form a polymer or polymer network; crosslinking each polymer or polymer network to the other polymer or polymer network to form an interpenetrating polymer network ("IPN"); and forming the IPN into the portion of the golf ball, wherein each polymeric component of the mixture is polymerized by exposing the mixture to at least one energy source, at least one initiator, or a combination thereof for a time sufficient to polymerize said polymeric component.

In another embodiment, the at least one energy source is selected from the group consisting of microwave radiation, infrared radiation, visible radiation, ultraviolet radiation, x-ray radiation, gamma radiation, electron beam radiation and a combination thereof. In another embodiment, the at least one initiator is selected from the group consisting of a thermal free radical initiator, a photoinitiator, a cationic initiator, and a mixture thereof.

In a preferred embodiment, the thermal free radical initiator is selected from the group consisting of an azo compound, a peroxide, a persulfate, a redox initiator, and mixtures thereof. In another preferred embodiment, the photoinitiator is selected from the group consisting of a peroxide, an azo compound, quinine, benzophenone, nitroso compound, acyl halide, hydrazone, a mercapto compound, a pyrylium compound, a triacylimidazole, an organophosphorus compounds, a bisimidazole, a chloroalkyltriazine, a benzoate, a benzoyl compound, a benzoin ether, a benzil ketal, a thioxanthone, an acetophenone derivative, a ketone, a metallocene, a hexafluorophosphate salt, a sulfonium salt, a diacrylate, a polyol, a pyrollidone, and mixtures thereof. In yet another preferred embodiment, the cationic initiator is selected from the group consisting of a Group IA organo compound, Group IIA organo compound, aryl sulfonium salt, hexafluorometallic salt, Bronsted acid, Lewis acid, and mixtures thereof. Typically, the initiator is present in an amount of greater than about 0.1 parts per hundred of total polymer component. Preferably, the initiator is present in an amount from about 0.1 to about 15 parts per hundred of total polymer component.

In one embodiment, the polymerization of each polymeric component is subsequent or simultaneous with the crosslinking of each polymer or polymer network to the other polymer or polymer network. In another embodiment, the first polymeric component is polymerized in the presence or absence of at least a second polymeric component to form a first polymer or first polymer network. In yet another embodiment, the second polymeric component is polymerized in the presence of the first polymeric component or the first polymer or first polymer network to form a second polymer or second polymer network. In another embodiment, crosslinking of the first polymer or first polymer network to the second polymer or second polymer network occurs subsequently or simultaneously with the polymerization of the second polymeric component to form the second polymer or second polymer network. In yet another embodiment, the polymerization of each polymeric component and the crosslinking of each polymer or polymer network to the other polymer or polymer network occurs simultaneously to form an IPN.

In one embodiment, the first polymeric component and the second polymeric component include monomeric, oligomeric or prepolymeric precursors of vinyl resins; polyolefins; polyurethanes; polyureas; polyamides; polyamide/polyurethane copolymers, polyamide/polyurea copolymers, epoxy-end-capped polyurethanes, epoxy-end-capped polyureas, polyamide/polyurethane ionomers, polyamide/polyurea ionomers, acrylic resins; olefinic rubbers; polyphenylene oxide resins; polyesters; blends of vulcanized, unvulcanized or non-vulcanizable rubbers with polyethylene, polypropylene, polyacetal, nylon, polyesters, or cellulose esters; or polymers or copolymers possessing epoxy-containing, or post-polymerization epoxy-functionalized repeat units.

In a preferred embodiment, the method further comprises providing a golf ball center; and disposing the IPN about the center to provide a portion of the golf ball. In another embodiment, the IPN is included in an intermediate layer disposed about the center. In another embodiment, the IPN is included in a cover layer disposed about the center.

The present invention is also directed to a method of forming a portion of a golf ball comprising the steps of providing a first polymeric component comprising at least one monomer, oligomer, prepolymer, or a combination thereof; sufficiently polymerizing the first polymer component to form a first polymer or first polymer network; providing a second polymeric component comprising at least one monomer, oligomer, prepolymer, or a combination thereof; sufficiently polymerizing the second polymer component to form a second polymer or second polymer; and crosslinking the first polymer or first polymer network with the second polymer or second polymer network to form an IPN.

In one embodiment, the first polymeric component is polymerized by exposing the first polymeric component to a first energy source, a first initiator, or a combination thereof for a time sufficient to polymerize the first polymeric component. In a preferred embodiment, the first energy source is selected from the group consisting of microwave radiation, infrared radiation, visible radiation, ultraviolet radiation, x-ray radiation, gamma radiation, electron beam radiation and a combination thereof. In another preferred embodiment, the first initiator is selected from the group consisting of a thermal free radical initiator, a photoinitiator, a cationic initiator, and a mixture thereof. In one embodiment, the first initiator is present in an amount of greater than about 0.01 parts per hundred of the first polymeric component. In a preferred embodiment, the initiator is present in an amount from about 0.01 to about 15 parts per hundred of total polymer component.

In another embodiment, the second polymeric component is polymerized by exposing the second polymeric component to a second energy source, a second initiator, or a combination thereof for a time sufficient to polymerize the second polymeric component. In a preferred embodiment, the second energy source is selected from the group consisting of microwave radiation, infrared radiation, visible radiation, ultraviolet radiation, x-ray radiation, gamma radiation, electron beam radiation and a combination thereof. In a more preferred embodiment, the second energy source is electron beam radiation.

In another preferred embodiment, the second initiator is selected from the group consisting of a thermal free radical initiator, a photoinitiator, a cationic initiator, and a mixture thereof. In one embodiment, the second initiator is present in an amount of greater than about 0.01 parts per hundred of the first polymeric component. In a preferred embodiment, the initiator is present in an amount from about 0.01 to about 15 parts per hundred of total polymer component.

In one embodiment, the first polymeric component is polymerized in the presence or absence of at least a second polymeric component to form a first polymer or first polymer network. In another embodiment, the second polymeric component is polymerized in the presence of the first polymeric component or the first polymer or first polymer network to form a second polymer or second polymer network. In yet another embodiment, crosslinking of the first polymer or first polymer network to the second polymer or second polymer network occurs subsequently or simultaneously with the polymerization of the second polymeric component to form the second polymer or second polymer network.

In one embodiment, the first polymeric component and the second polymeric component comprise monomeric, oligomeric or prepolymeric precursors of vinyl resins; polyolefins; polyurethanes; polyureas; polyamides; acrylic resins; olefinic rubbers; polyphenylene oxide resins; polyesters; blends of vulcanized, unvulcanized or non-vulcanizable rubbers with polyethylene, polypropylene polyacetal, nylon, polyesters, or cellulose esters; or polymers or copolymers possessing epoxy-containing, or post-polymerization epoxy-functionalized repeat units.

In one embodiment, the portion of the golf ball formed from the IPN is a core, intermediate layer or cover layer. In a preferred embodiment, the method further comprises providing a golf ball center; and disposing the IPN about the center to provide a portion of the golf ball. In a more preferred embodiment, the IPN is included in an intermediate layer disposed about the center. In another more preferred embodiment, the IPN is included in a cover layer disposed about the center.

The present invention is also directed to a golf ball including at least one layer, e.g., the cover layer, formed from an interpenetrating polymer network including a first polymeric system including a polyurethane or polyurea prepolymer cured with a first curing agent, wherein the prepolymer includes an isocyanate having terminal isocyanate groups, a blocking agent, and a polyol or a polyamine; and a second polymeric system including a) an epoxy resin and a second curing agent or b) an acrylate resin and an initiator. At least about 80 percent of the terminal isocyanate radicals groups are preferably blocked. For instance, at least about 95 percent or more of the terminal isocyanate groups may be blocked. In one embodiment, at least about 97 percent or more of the terminal isocyanate groups are blocked.

In this aspect of the invention, the blocking agent is selected from the group consisting of linear and branched alcohols; phenols and phenol derivatives; oximes; lactams; lactones; β-dicarbonyl compounds; hydroxamic acid esters; bisulfite addition compounds; hydroxylamines; esters of p-hydroxybenzoic acid; N-hydroxyphthalimide; N-hydroxysuccinimide; triazoles; substituted imidazolines; tetrahydropyrimidines; caprolactones; and mixtures thereof. For example, the blocking agent may be selected from the group consisting of phenols, branched alcohols, methyl ethyl ketoxime, ϵ-caprolactam, ϵ-caprolactone, and mixtures thereof.

In another embodiment, the second curing agent is selected from the group consisting of anhydrides, Lewis bases, amines, amides, Lewis acids, and mixtures thereof. The initiator may include benzoyl peroxide, t-amyl peroxide, or mixtures thereof.

The cover layer may include an inner cover layer and an outer cover layer, and wherein the outer cover layer includes the interpenetrating polymer network.

The present invention is also directed to a golf ball including a core and a cover, wherein a portion of the golf ball is formed from an interpenetrating polymer network including a first polymeric system including an isocyanate having terminal isocyanate groups, a polyol or amine-terminated component, and a blocked, delayed action curative; and a second polymeric system including a) an acrylate resin and an initiator or b) an epoxy resin and a curing agent. In one embodiment, the blocked delayed action curative includes methylene dianiline and sodium chloride having a deblocking temperature of about 175° F. to about 350° F.

In another embodiment, the first polymeric system is saturated. In another embodiment, the first polymeric system further includes a catalyst including an organometallic compound, tertiary amine, or combination thereof. When the second polymeric system is formed including an acrylate resin and an initiator, the initiator may include benzoyl peroxide, t-amyl peroxide, or mixtures thereof. And, when the second polymeric system includes an epoxy resin and a curing agent, the curing agent may be selected from the group consisting of anhydrides, Lewis bases, amines, amides, Lewis acids, and mixtures thereof.

In this aspect of the invention at least about 80 percent of the terminal isocyanate radicals groups are preferably blocked. For instance, at least about 95 percent or more, about 97 percent or more, or substantially all, of the terminal isocyanate groups may be blocked.

The golf ball may be of any construction. For example, in one embodiment, the golf ball includes an intermediate layer, which may be formed of a thermoplastic material. In another embodiment, the portion including the interpenetrating polymer network includes the cover.

The present invention is further directed to a method of forming a portion of a golf ball including the steps of:
providing a first polymeric component including a polyurethane or polyurea prepolymer having blocked isocyanate groups;
providing a second polymeric component including a) an epoxy resin or b) an acrylate resin;
sufficiently polymerizing the first and second polymeric components sequentially or simultaneously to form first and second polymeric systems;
crosslinking each polymeric system to the other polymeric system to form an interpenetrating polymer network ("IPN"); and
forming the IPN into the portion of the golf ball,
wherein each polymeric component of the mixture is polymerized by exposing the mixture to an energy source, curing agent, or a combination thereof for a time sufficient to polymerize the polymeric component.

In one embodiment, at least about 80 percent, preferably about 90 percent, of the isocyanate groups are blocked. In another embodiment, the step of forming the first polymeric component further includes the steps of: providing an isocyanate having terminal isocyanate groups; providing a polyol or amine-terminated component; reacting the isocyanate and polyol or amine-terminated component to form a prepolymer; and blocking the terminal isocyanate groups. In yet another embodiment, the step of blocking the terminal isocyanate groups further includes the steps of: providing a blocking agent; and blocking the terminal isocyanate groups with the blocking agent to form a blocked prepolymer.

In still another embodiment, the step of forming the first polymeric component further includes the steps of: providing an isocyanate having terminal isocyanate groups; providing a blocking agent; reacting the isocyanate and blocking agent to form a half-blocked intermediate; providing a polyol or amine-terminated component; reacting the half-blocked intermediate with a polyol or amine-terminated component to form a prepolymer.

The step of sufficiently polymerizing the first and second polymeric components may further include providing a first curing agent for the first polymeric component and a second curing agent for the second polymeric component. When the second polymeric system is an acrylate resin and an initiator, the step of sufficiently polymerizing the first and second polymeric components may further include providing a first curing agent for the first polymeric component and an initiator for the second polymeric component.

The blocking agent may include linear and branched alcohols; phenols and phenol derivatives; oximes; lactams; lactones; β-dicarbonyl compounds; hydroxamic acid esters; bisulfite addition compounds; hydroxylamines; esters of p-hydroxybenzoic acid; N-hydroxyphthalimide; N-hydroxysuccinimide; triazoles; substituted imidazolines; tetrahydropyrimidines; caprolactones; or mixtures thereof.

In this aspect of the invention, the at least one energy source is selected from the group consisting of microwave radiation, infrared radiation, visible radiation, ultraviolet radiation, x-ray radiation, gamma radiation, electron beam radiation and a combination thereof.

In one embodiment, the polymerization of each polymeric component is subsequent or simultaneous with the crosslinking of each polymeric system to the other polymeric system. In another embodiment, the polymerization of each polymeric component and the crosslinking of each polymeric system to the other polymeric system occurs simultaneously to form an IPN. In still another embodiment, the IPN included in a cover layer disposed about a center.

The present invention is also directed to a method of forming a portion of a golf ball including the steps of:
  providing a first polymeric component including an isocyanate, a polyol or amine-terminated component, and a blocked, delayed action curative;
  providing a second polymeric component including an epoxy resin or acrylate resin;
  sufficiently polymerizing the first and second polymeric components sequentially or simultaneously to form first and second polymeric systems;
  crosslinking each polymeric system to the other polymeric system to form an interpenetrating polymer network ("IPN"); and
  forming the IPN into the portion of the golf ball,
  wherein each polymeric component of the mixture is polymerized by exposing the mixture to an energy source, curing agent, or a combination thereof for a time sufficient to polymerize the polymeric component.

In one embodiment, the step of sufficiently polymerizing the first and second polymeric components further includes the steps of: elevating the temperature to deblock the blocked, delayed action curative; and providing a curing agent or initiator for the second polymeric component.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
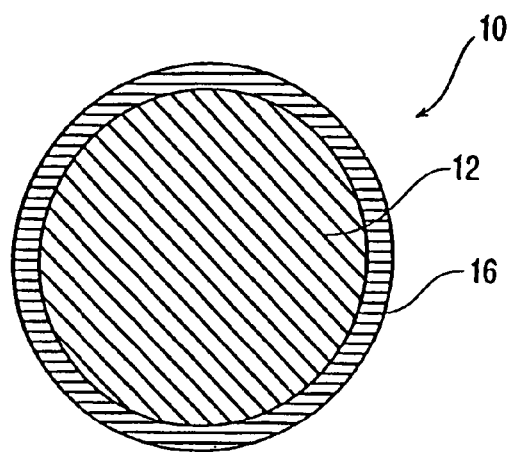
FIG. 1 illustrates a golf ball including a center and a cover layer disposed over the center, in which at least one of the center or the cover layer includes an IPN.

The present invention relates to compositions including interpenetrating polymer networks (IPNs) formed from two different polymer chains. The IPNs may be formed using a blocked polyurethane prepolymer and an epoxy resin. In addition, an IPN of the present invention may be formed using a blocked polyurea prepolymer and an acrylate functional resin. Each system includes a curing agent for the prepolymer and a curing agent/catalyzing agent/initiator for the second polymeric component, i.e., the epoxy resin or acrylate functional resin.

The compositions of the invention may be used with golf balls of various constructions, e.g., one-piece golf balls, two-piece golf balls, or multilayer golf balls having a center, at least one intermediate layer disposed concentrically adjacent to the center, and at least one cover layer.

The Compositions of the Invention

As briefly discussed above, the compositions of the invention include an IPN, which generally improve the compatibility of polymeric components. IPNs are formed when polymerizable compositions are independently reacted to form distinct, intertwining, continuous polymeric chains. Combining chemically different types of polymeric networks results in the formation of resins having different properties. The interpenetrating polymer network produced exhibits properties that are different from the individual constituent polymers. In accordance, the term "interpenetrating polymer network" or "IPN", as used herein, refers to two chemically different polymer chains intertwined with each other.

IPNs useful for the present invention may include two or more different polymers or polymer networks and can encompass any one or more of the different types of IPNs listed and described below, which may overlap:

(1) Sequential IPNs, in which monomers or prepolymers for synthesizing one polymer or a polymer network are polymerized in the presence of another polymer or polymer network. These networks may have been synthesized in the presence of monomers or prepolymers of the one polymer or polymer network, which may have been interspersed with the other polymer or polymer network after its formation or cross-linking;

(2) Simultaneous IPNs, in which monomers or prepolymers of two or more polymers or polymer networks are mixed together and polymerized and/or crosslinked simultaneously, such that the reactions of the two polymer networks do not substantially interfere with each other;

(3) Grafted IPNs, in which the two or more polymers or polymer networks are formed such that elements of the one polymer or polymer network are occasionally attached or covalently or ionically bonded to elements of an/the other polymer(s) or polymer network(s);

(4) Semi-IPNs, in which one polymer is cross-linked to form a network while another polymer is not; the polymerization or crosslinking reactions of the one polymer may occur in the presence of one or more sets of other monomers, prepolymers, or polymers, or the composition may be formed by introducing the one or more sets of other monomers, prepolymers, or polymers to the one polymer or polymer network, for example, by simple mixing, by solubilizing the mixture, e.g., in the presence of a removable solvent, or by swelling the other in the one;

(5) Full, or "true," IPNs, in which two or more polymers or sets of prepolymers or monomers are crosslinked (and thus polymerized) to form two or more interpenetrating crosslinked networks made, for example, either simultaneously or sequentially, such that the reactions of the two polymer networks do not substantially interfere with each other;

(6) Homo-IPNs, in which one set of prepolymers or polymers can be further polymerized, if necessary, and simultaneously or subsequently crosslinked with two or more different, independent crosslinking agents, which do not react with each other, in order to form two or more interpenetrating polymer networks;

(7) Gradient IPNs, in which either some aspect of the composition, frequently the functionality, the copolymer content, or the crosslink density of one or more other polymer networks gradually vary from location to location within some, or each, other interpenetrating polymer network(s), especially on a macroscopic level;

(8) Thermoplastic IPNs, in which the crosslinks in at least one of the polymer systems involve physical crosslinks, e.g., such as very strong hydrogen-bonding or the presence of crystalline or glassy regions or phases within the network or system, instead of chemical or covalent bonds or crosslinks; and (9) Latex IPNs, in which at least one polymer or set of prepolymers or monomers are in the form of lattices, frequently (though not exclusively) in a core-shell type of morphology, which form an interpenetrating polymer network when dried, for example, as a coating on a substrate (if multiple polymers or sets of prepolymers or monomers are in the form of lattices, this is sometimes called an "interpenetrating elastomer network," or IEN).

The polymer chains may be crosslinked, however, no apparent chemical bonding should occur between the polymer chains, i.e., inter-crosslinking, with the exception of the occasional/accidental covalent bond. Thus, it should be understood that an IPN according to the invention should not include a copolymer network. The term "copolymer network," as used herein, can be defined as a single polymer network formed from two or more different types of monomers, oligomers, precursor packages, or polymers, during which network formation: a) the crosslinking reaction(s) result(s) in the different types of polymers, oligomers, or precursors being sufficiently inter-crosslinked, i.e., the polymers, oligomers, or precursors of one or more types are connected to polymers, oligomers, or precursors of the other different types, such that effectively one crosslinked network connecting all the different monomers, oligomers, precursors, or polymers is formed; b) the contemporaneous or consecutive polymerization reaction(s) of all the different types of monomers, oligomers, or precursors result(s) in two or more different types of copolymers, which may themselves be oligomeric or polymeric and may be precursors to (an)other type(s) of copolymer(s), and which may then undergo inter-crosslinking reaction(s), as in a), between the different types of copolymers; c) the contemporaneous or consecutive polymerization reaction(s) of all the different types of monomers, oligomers, or precursors result(s) in a single type of copolymer, which may itself be oligomeric or polymeric and may be a precursor to another type of copolymer, and which may then undergo a sufficient intra-crosslinking reaction, i.e., the copolymer chains of the single type are connected to other copolymer chains of the same type, such that effectively a single crosslinked network connecting copolymer chains is formed; or d) any combination thereof.

For example, a grafted IPN is distinguishable from a copolymer network, in that the inter-crosslinking of a grafted IPN is only occasional, resulting in relatively few cross-type polymer linkages, while the inter-crosslinking of a copolymer network occurs relatively frequently, resulting in a relatively large amount of cross-type polymer linkages. As a result, the copolymer network is effectively a single copolymer network, while the grafted IPN according to the invention may be lightly inter-crosslinked but is effectively a combination of at least two, preferably co-continuous, polymer networks. Preferably, grafted IPNs according to the invention have a substantial lack of cross-type polymer linkages, or inter-crosslinking. In the context of the present invention, a component that has a "substantial lack of" an item should be understood to have less than about 20 percent, preferably to have less than about 10 percent, more preferably to be substantially free of that item. As used herein, the phrase "substantially free of" means that there is less than about 5 percent, preferably less than about 2 percent, and more preferably less than about 1 percent of that item present. Most preferably, it means that the component or composition is completely free of that item. In one embodiment, a layer containing a gradient IPN according to the invention has a flexural modulus below about 5 ksi.

With the exception of grafted IPNs above, all forms of crosslinking recited in the descriptions of IPNs above should hereby be understood to be intra-crosslinks, or same-type polymer linkages, i.e., crosslinks between polymer chains made from the same precursor package. Still, grafted IPNs predominantly contain intra-crosslinks, but also contain a small amount of inter-crosslinks.

It should also be understood that an IPN according to the invention should not include a combination of an individual polymer and a polymer network of essentially the same type as the individual polymer, e.g., a single type of homopolymer or copolymer, such as PMMA, that has been: a) incompletely crosslinked, such as by incorporation of an appropriate amount of diacrylate monomer; or b) incompletely or completely crosslinked and then blended with uncrosslinked, neat PMMA, is not considered an IPN according to the present invention, despite its possible characterization as a semi-homo-IPN. Such a combination is considered a partially-crosslinked, single-polymer network or system.

IPNs of the present invention contain two or more polymers, at least one of which is crosslinked to form a network. In considering polymers useful in golf balls of the present invention, examples include crosslinked or uncrosslinked incarnations of any polymer capable of being incorporated into an interpenetrating polymer network. Particularly exemplary polymers include, but are not limited to, polyurea, polyamide/polyurethane copolymer, polyamide/polyurea copolymer, epoxy-end-capped polyurethane, epoxy-end-capped polyurea, polyamide/polyurethane ionomers, polyamide/polyurea ionomers, urethane polymers or copolymers, polymers made from an epoxy-containing precursor, polymers having backbone or pendant ester groups, polyimides or copolymers containing imide groups, polymers or copolymers containing siloxane groups, polymers or copolymers containing silane groups, acrylate polymers or copolymers (including, but not limited to, mono-, di-, tri, and/or tetra-acrylates), alkyl acrylate polymers or copolymers, alkyl alkyl-acrylate polymers or copolymers, for example, such as poly(methyl methacrylate) and the like, polyacrylic acids or poly(alkyl-acrylic acids), including, but not limited to, monomers such as acrylic acid or methacrylic acid, polymers or copolymers containing vinyl acetate repeat units, polymers or copolymers containing halogen groups, polymers or copolymers containing a uretdione group, polymers or copolymers containing an oxazolidone group, or mixtures thereof. Other examples of useful polymers may include polymers or copolymers containing or made from a conjugated diene, polymers or copolymers containing a styrenic moiety, ionomeric polymers or copolymers, or mixtures thereof. Preferred first, second or more polymeric components include monomeric, oligomeric or prepolymeric precursors of vinyl resins, polyolefins, polyurethanes, polyureas, polyamide and mixtures and copolymers thereof, such as those described in U.S. Pat. Nos. 6,646,061, 6,645,091, 6,648,776, and copending U.S. patent application Ser. No. 10/190,705, the entirety of which are incorporated herein.

In one embodiment, the IPN of the present invention includes a first polymeric system including a blocked prepolymer and a second polymeric system including an epoxy resin or acrylate resin. The blocked prepolymer may be polyurea-based or polyurethane-based. The specifics of the polymeric system are discussed in more detail below.

When the second polymeric component is an epoxy resin, the blocked prepolymer is mixed with the second polymeric component in the presence of a curing agent/catalyzing agent and a short chain amine-terminated component or a short chain hydroxy-terminated component. For example, once the mixed material is heated to the temperature necessary for deblocking the isocyanate groups, the prepolymer reacts with the short chain amine-terminated component or short chain hydroxy-terminated component to form a cured polyurea-based system or polyurethane-based system. At the same time, the epoxy system reacts with the curing agent/catalyzing agent to form a cured epoxy system. The two cured systems form an IPN.

In the alternative, a "deblocking" agent may be added to the mixed material to react with the blocked isocyanate groups, which allows the prepolymer to react with the curing agent to form a cured polyurea-based system or polyurethane-based system. The epoxy system simultaneously or sequentially reacts with its respective curing agent/catalyzing agent to form a cured epoxy system. The two cured systems form an IPN according to the present invention.

Likewise, when the second polymeric component is an acrylic resin, the blocked prepolymer is mixed with the second polymeric component in the presence of an initiator to cure the second polymeric component and a short chain amine-terminated component or a short chain hydroxy-terminated component to cure the prepolymer.

In the alternative, an excess of the short chain amine-terminated or hydroxy-terminated component may be included in an amount sufficient to cure both the first and second polymeric components (instead of using a separate curing agent/catalyzing component for the second polymeric component) for either type of IPN, i.e., an IPN including an epoxy system or an IPN including an acrylic resin system.

It is important to note that when a short chain hydroxy-terminated component is used as a curing agent for a polyurea-based prepolymer, the resulting polyurea-based system will contain urethane linkages as a result of the excess isocyanate reacting with the hydroxy groups of the curing agent. Thus, for the purposes of the present invention, such a system is referred to as a polyurea-urethane system as opposed to a polyurea system, which contains only urea linkages. Likewise, a polyurethane prepolymer cured with an amine-terminated curing agent will produce a system including both urethane and urea linkages and will thus be referred to as a polyurethane-urea system. Examples of suitable curing agents/catalyzing agents for the epoxy resin, initiators for the acrylic resins, and amine-terminated and hydroxy-terminated curing agents for the prepolymer will be discussed in greater detail below.

The First Polymeric System

A blocked urethane or urea prepolymer may form the first polymeric system of an IPN of the present invention. In particular, the urethane or urea can be blocked to prevent premature polymerization or crosslinking of the polyisocyanate groups. Because the two polymeric systems of the IPN may be cured simultaneously, the isocyanates groups may be subjected to heat to deblock the isocyanates once the prepolymer curing agent and curing agent/catalyzing agent/initiator are added to cure the two polymeric systems and form the IPN. In the alternative, a "deblocking" agent may be used to react with the blocked isocyanate groups in order to allow the isocyanate groups to react with the curing agent to form the first polymeric system.

In the context of the present invention, the term "prepolymer" refers generally to a macromonomer or partially polymerized material formed by the reaction product of at least two components, each having a functionality that is reactive with at least one other component under the appropriate circumstances, which macromonomer or partially polymerized material can be subsequently reacted with at least one other component (which may be the same as one of the at least two components or different) to form a polymer. In particular, a "prepolymer" may refer to a material containing at least one isocyanate-containing component and at least one isocyanate-reactive component, for example, such as a polyol, a polyamine, an epoxy-containing compound, or a mixture thereof. Alternatively, "prepolymers" according to the present invention may not include an isocyanate-containing component.

As briefly mentioned above, the prepolymer used in this aspect of the invention may be a polyurethane prepolymer or a polyurea prepolymer. The polyurea prepolymer is the reaction product of an amine-terminated component and an isocyanate, whereas the polyurethane prepolymer is the reaction product of a hydroxy-terminated component and an isocyanate. The particular components of the prepolymers will be discussed in greater detail below.

Because the main difference between the polyurea prepolymer and the polyurethane prepolymer is the amine-terminated component/polyol component, the isocyanates discussed are intended to be used in either type of prepolymer.

The Isocyanate Component

Any isocyanate having two or more isocyanates groups, e.g., two to four isocyanate groups, bonded to an organic radical, may be used in the prepolymers of the present invention. The general formula of a suitable isocyanate for use with the present invention is as follows:

$$R\text{---}(NCO)_x$$

where R may be any organic radical having a valence x. In one embodiment, R is a straight or branched hydrocarbon moiety, acyclic group, cyclic group, heterocyclic group, aromatic group, phenyl group, hydrocarbylene group, or a mixture thereof. For example, R may be a hydrocarbylene group having about 6 to about 25 carbons, preferably about 6 to about 12 carbon atoms. In another embodiment, R is unsubstituted or substituted. For example, in some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Because light stability of the compositions of the invention may be accomplished in a variety of ways for the purposes of this application, i.e., through the use of saturated components, light stabilizers, whitening agents, or a mixture thereof, the isocyanate used in the prepolymer may be saturated, semi-saturated, unsaturated, or a mixture thereof. For example, isocyanates for use with the present invention include aliphatic (saturated), cycloaliphatic, aromatic aliphatic (semi-saturated), aromatic (unsaturated), any derivatives thereof, and combinations of these compounds having two or more isocyanate (NCO) groups per molecule. The term "saturated," as used herein, refers to compositions having saturated aliphatic and alicyclic polymer backbones, i.e., with no carbon-carbon double bonds. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI).

The isocyanates may be organic polyisocyanate-terminated prepolymers, low free isocyanate prepolymer, and mixtures thereof. The isocyanate-containing reactable component may also include any isocyanate-functional monomer, dimer, trimer, or polymeric adduct thereof, prepolymer, quasi-prepolymer, or mixtures thereof.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-di isocyanate; tetramethylene-1,2-diisocyanate; tetramethylene-1,3-diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane di isocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4' dicyclohexylmethane diisocyanate (H12MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof; dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Of the list above, the following isocyanates are saturated: ethylene diisocyanate; propylene-1,2-diisocyanate; tetramethylene diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-di isocyanate; cyclohexane-1,4-diisocyanate; methylcyclohexylene di isocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate (H12MDI); 2,4-hexahydrotoluene diisocyanate; 2,6-hexahydrotoluene diisocyanate; and mixtures thereof. Aromatic aliphatic isocyanates may also be used to form light stable materials. Examples of such isocyanates include 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof; dimerized uretdione of any polyisocyanate, such as uretdione of toluene diisocyanate, uretdione of hexamethylene diisocyanate, and mixtures thereof; a modified polyisocyanate derived from the above isocyanates and polyisocyanates; and mixtures thereof.

The Polyol or Polyamine

A polyurethane prepolymer is the reaction product of an isocyanate and a polyol. Exemplary polyols include, but are not limited to, polyether polyols, polycaprolactone polyols, polyester polyols, polycarbonate polyols, hydrocarbon polyols, and mixtures thereof. Both saturated and unsaturated polyols are suitable for use with the present invention.

Suitable polyether polyols for use in the present invention include, but are not limited to, polytetramethylene ether glycol (PTMEG); copolymer of polytetramethylene ether glycol and 2-methyl-1,4-butane diol (PTG-L); poly(oxyethylene) glycol; poly(oxypropylene) glycol; ethylene oxide capped (polyoxypropylene) glycol; poly (oxypropylene oxyethylene) glycol; and mixtures thereof.

Suitable polycaprolactone polyols include, but not limited to, diethylene glycol initiated polycaprolactone; propylene glycol initiated polycaprolactone; 1,4-butanediol initiated polycaprolactone; trimethylol propane initiated polycaprolactone; neopentyl glycol initiated polycaprolactone; 1,6-hexanediol initiated polycaprolactone; polytetramethylene ether glycol (PTMEG) initiated polycaprolactone; ethylene glycol initiated polycaprolactone; dipropylene glycol initiated polycaprolactone; and mixtures thereof.

Suitable polyester polyols include, but not limited to, polyethylene adipate glycol; polyethylene propylene adipate glycol; polybutylene adipate glycol; polyethylene butylene adipate glycol; polyhexamethylene adipate glycol; polyhexamethylene butylene adipate glycol; ortho-phthalate-1,6-hexanediol polyester polyol; polyethylene terephthalate polyester polyols; and mixtures thereof.

Examples of polycarbonate polyols that may be used with the present invention include, but is not limited to, poly(phthalate carbonate) glycol, poly(hexamethylene carbonate) glycol, polycarbonate polyols containing bisphenol A, and mixtures thereof. Hydrocarbon polyols include, but not limited to, hydroxy-terminated liquid isoprene rubber (LIR), hydroxy-terminated polybutadiene polyol, hydroxy-terminated polyolefin polyols, hydroxy-terminated hydrocarbon polyols, and mixtures thereof. Other polyols that may be used to form the prepolymer of the invention include, but not limited to, glycerols; castor oil and its derivatives; Polytail H; Polytail HA; Kraton polyols; acrylic polyols; acid functionalized polyols based on a carboxylic, sulfonic, or phosphoric acid group; dimer alcohols converted from the saturated dimerized fatty acid; and mixtures thereof.

By using polyols based on a hydrophobic backbone, the polyurethane compositions of the invention may be more water resistant than those polyurethane compositions having polyols without a hydrophobic backbone. Some non-limiting examples of polyols based on a hydrophobic backbone include hydrocarbon polyols, hydroxy-terminated polybutadiene polyols, polyethers, polycaprolactones, and polyesters.

Polyurea prepolymers are the reaction product of an amine-terminated component and an isocyanate. Any amine-terminated compound available to one of ordinary skill in the art is suitable for use in the polyurea prepolymer. The amine-terminated compound may include amine-terminated hydrocarbons, amine-terminated polyethers, amine-terminated polyesters, amine-terminated polycarbonates, amine-terminated polycaprolactones, copolymers of polycaprolactone and polyamines, amine-terminated polyamides, and mixtures thereof. The amine-terminated segments may be in the form of a primary amine ($NH_2$) or a secondary amine (NHR).

Additional amine-terminated compounds useful in forming the polyurea prepolymers of the present invention include, but are not limited to, poly(acrylonitrile-co-butadiene); poly(1,4-butanediol) bis(4-aminobenzoate) in liquid or waxy solid form; linear and branched polyethylenimine; low and high molecular weight polyethylenimine having an average molecular weight of about 500 to about 30,000; poly(propylene glycol) bis(2-aminopropyl ether) having an average molecular weight of about 200 to about 5,000; polytetrahydrofuran bis(3-aminopropyl) terminated having an average molecular weight of about 200 to about 2000; and mixtures thereof, all of which are available from Aldrich of Milwaukee, Wis.

Blocking the Isocyanate Groups

As briefly mentioned above, the isocyanate groups in the prepolymer are preferably blocked as a result of the reaction of a suitable isocyanate with a blocking agent. The blocking agent may be any suitable blocking agent that results in the prevention of premature polymerization or crosslinking of the isocyanate group(s) in the prepolymer.

Suitable blocking agents include, but are not limited to, linear and branched alcohols; phenols and derivatives thereof, such as xylenol; oximes, such as methyl ethyl ketoxime; lactams, such as ε-caprolactam; lactones, such as caprolactone; β-dicarbonyl compounds; hydroxamic acid esters; bisulfite addition compounds; hydroxylamines; esters of p-hydroxybenzoic acid; N-hydroxyphthalimide; N-hydroxysuccinimide; triazoles; substituted imidazolines; tetrahydropyrimidines; caprolactones; and mixtures thereof. In one embodiment, the blocking agent is selected from the group consisting of phenols, branched alcohols, methyl ethyl ketoxime, ε-caprolactam, ε-caprolactone, and mixtures thereof.

In this aspect of the invention, preferably greater than about 80 percent of the isocyanate radicals are blocked, and more preferably about 90 percent or greater of the isocyanate radicals are blocked. In one embodiment, about 95 percent or more of the isocyanate radicals are blocked. In another embodiment, about 97 percent or more of the isocyanate radicals are blocked. In still another embodiment, substantially all of the isocyanate radicals are blocked.

The blocked isocyanate compound is stable at room temperature as a carbamic acid compound free of isocyanate radicals capable of liberating at room temperature. When heated, or reacted with a "deblocking" agent, the isocyanate radicals are activated, i.e., deblocked and dissociated. For example, in one embodiment, the isocyanate group(s) is blocked with ε-caprolactone. The ε-caprolactone volatilizes at a temperature of approximately 300° F., exposing the polyisocyanate groups for crosslinking.

The reaction of the isocyanate and blocking agent may be accomplished in any suitable way that results in a blocked prepolymer. For example, the isocyanate groups may be blocked after the prepolymer is formed. One example of such a blocking mechanism using a polyurea prepolymer is shown below:

$$H_2N-R-NH_2 \quad + \quad 2\,OCN-R_1-NCO \longrightarrow$$

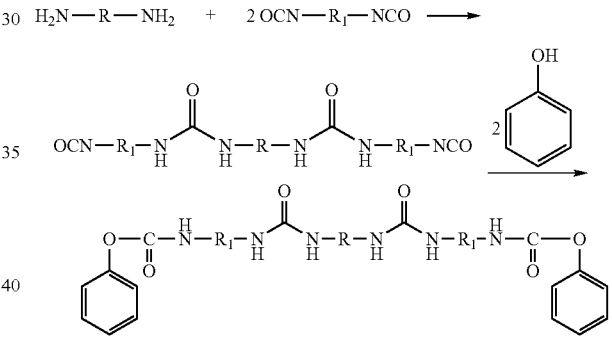

where R and $R_1$ may be independently any straight or branched hydrocarbon moiety, acyclic group, cyclic group, heterocyclic group, aromatic group, phenyl group, hydrocarbylene group, or a mixture thereof.

In particular, a blocked polyurea prepolymer may be formed by first reacting a polyamide-based amine and an excess of isocyanate to form a polyamide-based polyurea prepolymer and then blocking the prepolymer with a phenol to form a blocked polyamide-based polyurea prepolymer. The general reaction scheme is as follows:

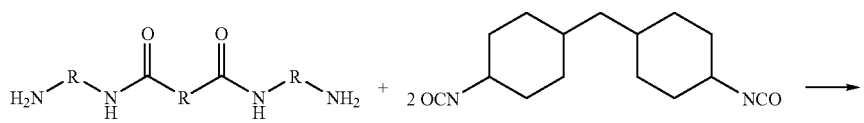

-continued

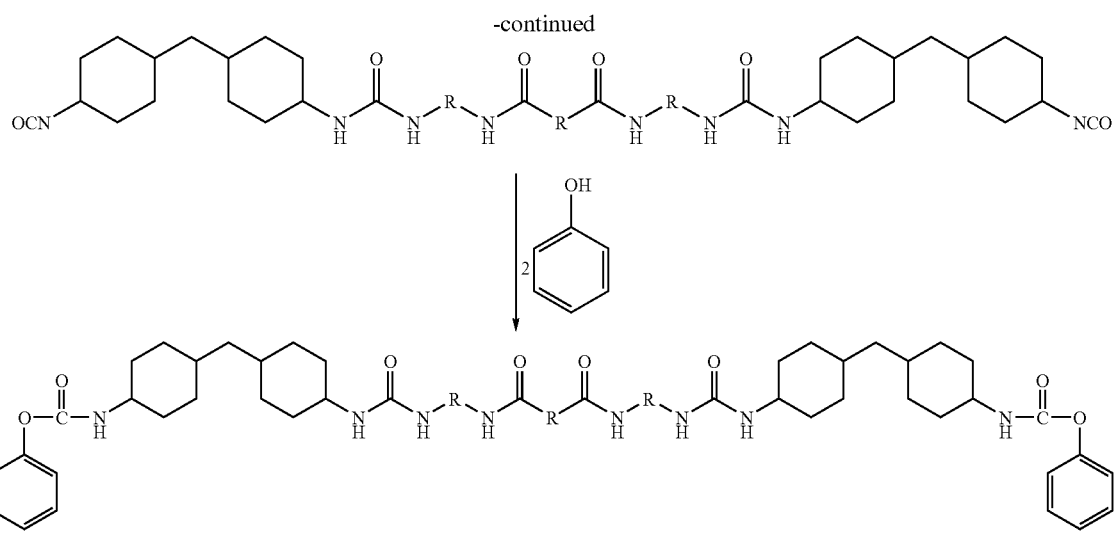

where R may be independently any straight or branched hydrocarbon moiety, acyclic group, cyclic group, heterocyclic group, aromatic group, phenyl group, hydrocarbylene group, or a mixture thereof.

A blocked polyurethane prepolymer may be formed in a similar manner, using a hydroxy-terminated component in place of the amine-terminated component. A general reaction scheme is shown below:

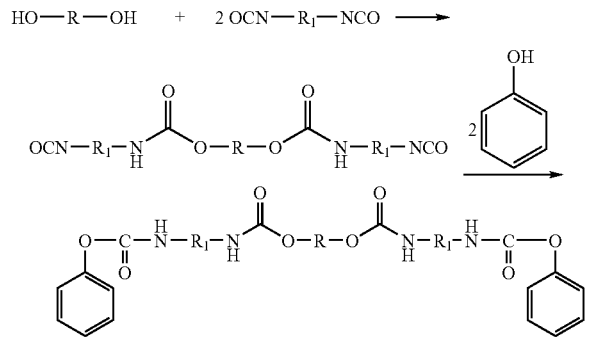

where R and $R_1$ may be independently any straight or branched hydrocarbon moiety, acyclic group, cyclic group, heterocyclic group, aromatic group, phenyl group, hydrocarbylene group, or a mixture thereof.

The blocking mechanism may also be performed prior to the formation of the prepolymer. For example, a diisocyanate having isocyanate radicals with different reactivities, such as 2,4-toluene diisocyanate, may be used to form a half-blocked intermediate. The half-blocked intermediate is then reacted with an amine-terminated component to form a polyurea prepolymer or a polyol to form a polyurethane prepolymer. The blocking agent used to form the half-blocked intermediate may be any suitable blocking agent. One specific example includes the use of equal parts of 2-ethylhexanol and 2,4-toluene diisocyanate.

In addition, commercially available urethane and urea elastomers with blocked isocyanate groups are contemplated for use as the first polymeric system of the invention. For example, ADIPRENE® BL-16, commercially available from Crompton Corporation of Middlebury, Conn., is a liquid urethane elastomer with blocked isocyanate curing sites that can be activated by heating. The blocking agent is methyl ethyl ketoxime. The free isocyanate content is less than 0.25 percent by weight.

The Curing Agent

The prepolymers of the present invention may be cured with a hydroxy-terminated curing agent, an amine-terminated curing agent, or a mixture or hybrid thereof, which may include one or more saturated, unsaturated, aromatic, and cyclic groups. Additionally, the hydroxy-terminated and amine-terminated curatives may include one or more halogen groups.

"Curing agents," as used herein, means any compound, or combination thereof, capable of connecting at least two polymeric or oligomeric chains, precursors, or macromonomers together under appropriate circumstances. For example, in step-growth or condensation polymers, e.g., such as the polyurethane-based or polyurea-based systems of the present invention, a curing agent may serve to build the linear molecular weight of a single polymer molecule, to create, e.g., a crosslinked urethane/urea network, or both. As another example, in epoxy-based systems such as the second polymeric system discussed in more detail below, a curing agent may simultaneously or sequentially facilitate polymerization and network formation. In most other types of polymers, frequently formed through addition polymerization, curing agents serve only to crosslink polymers that have already been fully or desirably polymerized. For the purposes of this disclosure, curing agents may also be referred to as either "chain extenders," "crosslinkers," or both.

As discussed above, however, the selection of the type of prepolymer and curing agent determines the type of linkages present in the first polymeric system. For example, when a hydroxy-terminated curing is used as a curing agent for a polyurea-based prepolymer, the resulting system will contain urethane linkages as a result of the excess isocyanate reacting with the hydroxy groups of the curing agent and is referred to as a polyurea-urethane system as opposed to a pure polyurea system, which contains only urea linkages. Similarly, a polyurethane prepolymer cured with an amine-terminated curing agent will produce a system including both urethane and urea linkages and is referred to as a polyurethane-urea system.

Suitable hydroxy-containing curing agents have a molecular weight of about 50 to about 4,000, and include, but are not limited to, unsaturated diols, such as:

1) 1,3-bis(2-hydroxyethoxy)benzene; 1,3-bis[2-(2-hydroxyethoxy)ethoxy]benzene; 1,3-bis{2-[2-(2-hydroxyethoxy)ethoxy]ethoxy} benzene;
2) N,N-bis(β-hydroxypropyl)aniline;
3) hydroquinone-di(β-hydroxyethyl)ether; resorcinol-di (β-hydroxyethyl)ether;
4) ethoxylates of the bis-phenols; bis(2-hydroxyethyl) bisphenol; and
5) tetramethylxylylene diols; xylene glycol, saturated diols, such as:

1) ethylene glycol; diethylene glycol; polyethylene glycol; propylene glycol; dipropylene glycol; polypropylene glycol; 2-methyl-1,3-propanediol; 1,2-, 1,3-, 1,4-, or 2,3-butanediols; 2-methyl-1,4-butanediol; 2,3-dimethyl-2,3-butanediol; 1,5-pentanediol; neopentyl glycol; 1,6-hexanediol; trimethylolpropane;
2) cyclohexyldimethylol;
3) 1,3-bis(2-hydroxyethoxy)cyclohexane; 1,3-bis[2-(2-hydroxyethoxy)ethoxy]cyclohexane; 1,3-bis{2-[2-(2-hydroxyethoxy)ethoxy]ethoxy}cyclohexane; and
4) PTMEG having a molecular weight of about 200 to about 4000, unsaturated triols, such as castor oil (a.k.a. triricinoleoyl glycerol), saturated triols, such as 1,2,4-butanetriol; 1,2,6-hexanetriol; trimethylolethane (a.k.a. 1,1,1-tri(hydroxymethyl)ethane); trimethylolpropane (a.k.a. 2,2-di(hydroxymethyl)-1-butanol); triethanolamine; and triisopropanolamine, unsaturated tetraols, such as 2-propanol-1,1'-phenylaminobis and 2,4,6-tris (N-methyl-N-hydroxymethyl-aminomethyl)phenol, saturated tetraols, such as pentaerythritol (a.k.a. tetramethylolmethane); and tetrahydroxypropylene ethylenediamine (a.k.a. N,N,N',N'-tetrakis(2-hydroxypropyl)-ethylenediamine), and other polyols such as mannitol (a.k.a. 1,2,3,4,5,6-hexanehexyl) and sorbitol (an enantiomer of mannitol) (both saturated).

Suitable amine-containing curing agents may have a molecular weight of about 50 to about 5,000, and include, but are not limited to, unsaturated diamines, such as:

1) m-phenylenediamine; o-phenylenediamine; p-phenylenediamine; 2,4- and 2-6-toluene diamine; 1,2-, 1,3-, or 1,4-bis(sec-butylamino)benzene (Unilink 4100); 3,3'-dimethyl-4,4'-biphenylene diamine; 1,2-, 1,3-, or 1,4-bis(sec-butylamino) xylene;
2) 3,5-diethyl-(2,4- or 2,6-) toluenediamine; 3,5-dimethylthio-(2,4- or 2,6) toluenediamine; 3,5-diethylthio-(2, 4- or 2,6-) toluenediamine;
3) 4,4'-diamino-diphenylmethane (a.k.a. 4,4'-methylenedianiline or "MDA"); 3,3'-dimethyl-4,4'-diamino-diphenylmethane; 3,3'-diethyl-5,5'-dimethyl-4,4'-diamino-diphenylmethane (a.k.a. 4,4'-methylene-bis(2-ethyl-6-methyl-benezeneamine)); 3,3'-dichloro-4,4'-diamino-diphenylmethane (a.k.a. 4,4'-methylene-bis(2-chloroaniline) or "MOCA"); 3,3'-diethyl-5,5'-dichloro-4,4'-diamino-diphenylmethane; 3,3',5,5'-tetraethyl-4,4'-diamino-diphenylmethane (a.k.a. 4,4'-methylene-bis(2, 6-diethylaniline) or "MDEA"); 2,2'-dichloro-3,3',5,5'-tetraethyl-4,4'-diamino-diphenylmethane (a.k.a. 4,4'-methylene-bis(3-chloro-2,6-diethyleneaniline) or "MCDEA"); 3,3'-dichloro-4,4'-diamino-diphenylmethane; 2,2',3,3'-tetrachloro-4,4'-diamino-diphenylmethane (a.k.a. 4,4'-methylene-bis(2,3-dichloroaniline) or "MDCA"); 3,3'-dichloro-2,2',6,6'-tetraethyl-4,4'-diaminodiphenylmethane; 4,4'-bis-(sec-butylamino)-diphenylmethane (Unilink 4200); 3,3'-dimethyl-4,4'-bis-(sec-butylamino)-diphenylmethane; N,N'-dialkylamino-diphenylmethane; 3,3',5,5'-tetraisopropyl-4,4'-diaminodiphenylmethane; 3,3'-dimethyl-5,5'-diisopropyl-4,4'-diaminodiphenylmethane; 3,3'-diethyl-5,5'-diisopropyl-4,4'-diaminodiphenylmethane; 3,3'-dimethyl-5,5'-di-t-butyl-4,4'-diaminodiphenylmethane; isomers thereof;
4) trimethyleneglycol-di(p-aminobenzoate); polyethyleneglycol-di(p-aminobenzoate); polytetramethyleneglycol-di(p-aminobenzoate);
5) 2,3,5,6-tetramethyl-1,4-diaminobenzene; and
6) m-xylene diamine; m-tetramethylxylene diamine, saturated diamines, such as:

1) ethylene diamine; 1,3-propylene diamine; 2-methyl-pentamethylene diamine; 1,3-pentanediamine; hexamethylene diamine; 2,2,4- and 2,4,4-trimethyl-1,6-hexane diamine;
2) imino-bis(propylamine); methylimino-bis(propylamine) (a.k.a. N-(3-aminopropyl)-N-methyl-1,3-propanediamine); 1,12-dodecanediamine;
3) 1,4-bis(3-aminopropoxy)butane (a.k.a. 3,3'-[1,4-butanediylbis-(oxy)bis]-1-propanamine); diethyleneglycol-bis(propylamine) (a.k.a. diethyleneglycol-di(aminopropyl)ether); 4,7,10-trioxatridecane-1,13-diamine; polyoxyethylene diamines; polyoxypropylene diamines; (ethylene oxide capped)-polyoxypropylene ether diamines; polytetramethylene ether diamines;
4) 1,4-diamino-cyclohexane; 1,3-diamino-cyclohexane; 1,2-diamino-cylcohexane; 1,4-diaminoethylcyclohexane; 1-methyl-3,5-diethyl-2,4 (2,6)-diaminocyclohexane; 1-methyl-3,5-dimethylthio-2,4 (2,6)-diaminocyclohexane; 1-methyl-2,6-diamino-cyclohexane; 1,2-, 1,3-, or 1,4-bis(methylamino)-cyclohexane; 1,2-, 1,3-, or 1,4-bis(sec-butylamino)-cyclohexane; 1,2-, 1,3-, or 1,4-bis(sec-butylamino methyl)-cyclohexane; isophorone diamine;
5) 4,4'-diamino-dicyclohexylmethane; 3,3'-dimethyl-4,4'-diamino-dicyclohexylmethane; 3,3'-diethyl-5,5'-dimethyl-4,4'-diamino-dicyclohexylmethane; 3,3'-dichloro-4,4'-diamino-dicyclohexylmethane; 3,3'-diethyl-5,5'-dichloro-4,4'-diamino-dicyclohexylmethane; 3,3',5,5'-tetraethyl-4,4'-diamino-dicyclohexylmethane (a.k.a. 4,4'-methylene-bis(2,6-diethylaminocyclohexane)); 2,2'-dichloro-3,3',5,5'-tetraethyl-4,4'-diamino-dicyclohexylmethane; 3,3'-dichloro-4,4'-diamino-dicyclohexylmethane; 2,2',3,3'-tetrachloro-4,4'-diamino-dicyclohexylmethane; 3,3'-dichloro-2,2',6,6'-tetraethyl-4,4'-dicyclohexylmethane; 4,4'-bis(sec-butylamino)-dicyclohexylmethane (Clearlink® 1000); N,N'-dialkylamino-dicyclohexylmethane; 3,3'-dimethyl-4,4'-bis(sec-butylamino)-dicyclohexylmethane (Clearlink® 3000); N,N'-diisopropyl-isophorone diamine (Jefflink® 754); 3-{[(5-amino-1,3,3-trimethylcyclohexyl)methyl]amino}-propanenitrile; N,N'-diethylmaleate-2-methyl-pentamethylene diamine (Desmophen® NH 1220); N,N'-di(ethylmaleate-amino)-dicyclohexylmethane (Desmophen® NH 1420); N,N'-di(ethylmaleate-amino)-dimethyl-dicyclohexylmethane (Desmophen® 1520); polyamine/carbonyl adducts;
6) 1-methyl-3,5-dimethylthio-(2,4- or 2,6-)cyclohexyldiamine; 1-methyl-3,5-diethyl-(2,4- or 2,6-)cyclohexyldiamine;

7) N-aminoethylpiperazine; 1,2-, 1-3, 1,4-bis-(isocyanatomethyl) cyclohexane;
8) 2,3,5,6-tetramethyl-1,4-diaminocyclohexane;
9) 3-bis-(1-amino-1-methylethyl)-cyclohexane (hydrogenated version of m-TMXDA);

triamines, such as diethylene triamine; dipropylene triamine; (propylene oxide)-based triamines (a.k.a. polyoxypropylene triamines); trimethylolpropane-based triamines, glycerin-based triamines, N-(2-aminoethyl)-1,3-propylenediamine (a.k.a. N₃-amine) (all saturated), tetramines, such as triethylene tetramine; N,N'-bis(3-aminopropyl)ethylenediamine (a.k.a. N₄-amine) (both saturated), and other polyamines, such as tetraethylene pentamine (also saturated).

Suitable amine-containing and hydroxy-containing hybrid curing agents may be monomeric, oligomeric, or polymeric, having at least one free reactive hydroxyl group and at least one free reactive amine group. The hydroxyl and amine groups may be terminal or pendant groups on the oligomeric or polymeric backbone, and in the case of secondary amine groups, may be embedded within the backbone. Non-limiting examples of the amine-containing and hydroxyl-containing hybrid curing agents include monoethanolamine; monoisopropanolamine; diethanolamine; and diisopropanolamine.

Saturated members of the above-listed curing agents are preferably chosen to react with saturated prepolymers, i.e., those formed from saturated isocyanates and saturated polyols or amine-terminated polymers, to form a saturated polyurethane or polyurea composition. Examples of saturated curatives include, but are not limited to, 1,4-butanediol; ethylene glycol; diethylene glycol; polyethylene glycol; propylene glycol; dipropylene glycol; polypropylene glycol; 2-methyl-1,3-propanediol; 2-methyl-1,4-butanediol; 2,3-dimethyl-2,3-butanediol; 1,4-cyclohexyldimethylol; 1,2-butanediol; 1,3-butanediol; 1,4-butanediol; 2,3-butanediol; trimethylolpropane; cyclohexyldimethylol; triisopropanolamine; diethylene glycol bis-(aminopropyl)ether; 1,5-pentanediol; 1,6-hexanediol; 1,3-bis-(2-hydroxyethoxy) cyclohexane; 1,3-bis-[2-(2-hydroxyethoxy) ethoxy]cyclohexane; 1,3-bis-{2-[2-(2-hydroxyethoxy) ethoxy]ethoxy}cyclohexane; polytetramethylene ether glycol having molecular weight ranging from about 250 to about 3900; ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine); diethylene glycol bis-(aminopropyl)ether; 2-methylpentamethylene-diamine; diaminocyclohexane; diethylene triamine; triethylene tetramine; tetraethylene pentamine; propylene diamine; dipropylene triamine; 1,3-diaminopropane; dimethylamino propylamine; diethylamino propylamine; imido-bis-(propylamine); monoethanolamine, diethanolamine; triethanolamine; monoisopropanolamine, diisopropanolamine; triisopropanolamine; isophoronediamine; N,N'-diisopropylisophorone diamine, 3,3'-dimethyl-4,4'-bis(sec-butylamino)-dicyclohexylmethane, and mixtures thereof.

To further improve the shear resistance of the resulting elastomers, a trifunctional curing agent may also be used to help improve cross-linking. In such cases, a triol, such as trimethylolpropane, or a tetraol, such as N,N,N',N'-tetrakis (2-hydroxylpropyl) ethylenediamine, may be added to the curative blends. Useful triamine curing agents for improving the crosslinking of polyurea elastomers include, but are not limited to: propylene oxide-based triamines; trimethylolpropane-based triamines; glycerin-based triamines; N,N-bis{2-[(aminocarbonyl) amino]ethyl}-urea; N,N',N''-tris(2-aminoethyl)-methanetriamine; N1-(5-aminopentyl)-1,2,6-hexanetriamine; 1,1,2-ethanetriamine; N,N',N''-tris(3-aminopropyl)-methanetriamine; N1-(2-aminoethyl)-1,2,6-hexanetriamine; N1-(10-aminodecyl)-1,2,6-hexanetriamine; 1,9,18-octadecanetriamine; 4,10,16,22-tetraazapentacosane-1,13,25-triamine; N1-{3-[[4-[(3-aminopropyl) amino]butyl] amino]propyl}-1,2,6-hexanetriamine; di-9-octadecenyl-(Z, Z)-1,2,3-propanetriamine; 1,4,8-octanetriamine; 1,5,9-nonanetriamine; 1,9,10-octadecanetriamine; 1,4,7-heptanetriamine; 1,5,10-decanetriamine; 1,8,17-heptadecanetriamine; 1,2,4-butanetriamine; propanetriamine; 1,3,5-pentanetriamine; N1-{3-[[4-[(3-aminopropyl) amino]butyl]amino]propyl}-1,2,6-hexanetriamine; N1-{4-[(3-aminopropyl) amino]butyl}-1,2,6-hexanetriamine; 2,5-dimethyl-1,4,7-heptanetriamine; N1-(6-aminohexyl)-1,2,6-hexanetriamine; 6-ethyl-3,9-dimethyl-3,6,9-undecanetriamine; 1,5,11-undecanetriamine; 1,6,11-undecanetriamine; N,N-bis(aminomethyl)-methanediamine; N,N-bis(2-aminoethyl)-1,3-propanediamine; methanetriamine; N1-(2-aminoethyl)-N2-(3-aminopropyl)-1,2,5-pentanetriamine; N1-(2-aminoethyl)-1,2,6-hexanetriamine; 2,6,11-trimethyl-2,6,1-dodecanetriamine; 1,1,3-propanetriamine; 6-(aminomethyl)-1,4,9-nonanetriamine; 1,2,6-hexanetriamine; N2-(2-aminoethyl)-1,1,2-ethanetriamine; 1,3,6-hexanetriamine; N,N-bis(2-aminoethyl)-1,2-ethanediamine; 3-(aminomethyl)-1,2,4-butanetriamine; 1,1,1-ethanetriamine; N1,N1-bis(2-aminoethyl) 1,2-propanediamine; 1,2,3-propanetriamine; 2-methyl-1,2,3-propanetriamine; and mixtures thereof.

In one embodiment, the curing agent is a blocked, delayed action curative that reacts slowly with the terminal isocyanate groups at room temperature. When the blocked, delayed action curative is heated to an elevated temperature, the curative rapidly cures the urethane or urea elastomer. In this aspect of the invention, the blocked, delayed action curative can include a salt complex that deblocks at an elevated temperature. The deblocking temperature may be any suitable elevated temperature that results in freeing the curing agent. For example, the deblocking temperature used to activate the curing process can be from about 175° F. to about 350° F., from about 185° F. to about 325° F., from about 195° F. to about 315° F., or from about 205° F. to about 305° F.

One example of a suitable blocked, delayed action curative for use with the first polymeric system is CAYTUR® 21, which is commercially available from Crompton Corporation of Middlebury, Conn. CAYTUR® 21 is a blocked, delayed action diamine curative that is used primarily with urethane elastomer prepolymers based on toluene diisocyanate and polyether polyols. It consists of a complex of methylene dianiline (MDA) and sodium chloride dispersed in dioctyl phthalate, wherein the salt complex deblocks at a temperature ranging from 212° F. to 302° F.

In another embodiment, the curing agent is a modified curative blend as disclosed in co-pending U.S. Patent Publication No. 2003/0212240, which is incorporated by reference herein in its entirety. For example, the curing agent of the invention may be modified with a freezing point depressing agent to create a curative blend with a slower onset of solidification and with storage stable pigment dispersion. The freezing point depressing agent is preferably added in an amount sufficient to reduce the freezing point of the curing agent by a suitable amount to prevent loss of pigment dispersion, but not affect the physical properties of the golf ball.

Thus, a curative blend according to the present invention may include a polyamine adduct and a freezing point depressing agent.

The Second Polymeric System

The second system included in the IPN of the invention may be based on an epoxy or an acrylic resin. The epoxy-based system is cured with a curing agent/catalyzing agent, whereas the acrylic-based system requires an initiator for polymerization. The particulars of each system are discussed in more detail below, however, the second polymeric system is cured at the same time or substantially the same time as the first polymeric system in order to form the IPN.

The Epoxy System

Any cured epoxy resin is suitable for use as the second polymeric system in the IPN of the present invention. Suitable epoxy resins include, but are not limited to, reaction products of bisphenol A and epichlorohydrin, reaction products of an aliphatic polyol and epichlorohydrin, and oxidized polyolefins. Examples of aliphatic polyols include any of the saturated polyols discussed above with respect the first polymeric system. In one embodiment, the aliphatic polyol is glycerol. The oxidized polyolefins may be oxidized using any suitable acid, e.g., peracetic acid. In one embodiment, the epoxy resin is a modified epoxy resin including halogenated bisphenol. A commercially available bisphenol A epoxy resin is EPON®, a Jeffamine resin manufactured by Huntsman Corporation of Austin, Tex.

In addition, epoxidized esters of unsaturated alcohols and unsaturated carboxylic acids are contemplated for use as the epoxy resin. In one embodiment, the epoxy resin includes at least one of glycidyl glycidate; 2,3-epoxybutyl-3,4-epoxypentanoate; 3,4-epoxy-3,4-epoxyhexyl; 3,4-epoxypentanoate; or mixtures thereof. In another embodiment, the second polymeric system include epoxidized esters of unsaturated monohydric alcohols and polycarboxylic acids, such as diglycidyl adipate; diglycidyl isophthalate; di(2,3-epoxybutyl) adipate; di(2,3-epoxybutyl) oxalate; di(2,3-epoxyhexyl) succinate; di(3,4-epoxybutyl) maleate; di(2,3-epoxyoctyl) pimelate; di(2,3-epoxybutyl) phthalate; di(2,3-epoxyoctyl) tetrahydrophthalate; di(4,5-epoxydodecyl) maleate; di(2,3-epoxybutyl) teraphthalate; di(2,3-epoxypentyl) thiodipropionate; di(5,6-epoxytetradecyl) diphenyldicarboxylate; di(3,4-epoxyheptyl) sulfonyldibutyrate; di(5,6-epoxypentadecyl) maleate; di(2,3-epoxybutyl) azelate; di(3,4-epoxybutyl) citrate; di(5,6-epoxyoctyl) cyclohexane-1,3-dicarboxylate; di(4,5-epoxyoctadecyl) malonate; tri(2,3-epoxybutyl)-1,2,4-butanetricarboxylate; and mixtures thereof.

Other examples of epoxy resins suitable for use with the present invention include, but are not limited to, epoxidized derivatives of polyethylenically unsaturated polycarboxylic acids; epoxidized polyesters that are the reaction product of an unsaturated polyhydric alcohol and/or an unsaturated polycarboxylic acid or anhydride groups; epoxidized polyethylenically unsaturated hydrocarbons; glycidyl ethers of novolac resins; and mixtures thereof.

The epoxy resin may be cured with a number of curing agents/catalyzing agents. In one embodiment, the curing agent is a Lewis base, such as alkali metal hydroxide. Lewis bases are those compounds containing an atom with an unshared electron pair in its outer orbital. They are attracted to areas of reduced electron density in the molecules with which they react. The organic bases, such as tertiary amines ($R_3N$:), are representative of the more reactive-type Lewis bases suitable for curing epoxy resins.

In another embodiment, the curing agent is a Lewis acid, such as a phenol. In still another embodiment, the curing agent is an amine, such as tri(dimethylaminomethyl-phenol and dimethylaminomethylphenol. In yet another embodiment, the curing agent is an amide, such as amidopolyamine.

The curing agent for the epoxy system may also be an anhydride. The anhydride may be alicyclic, linear polymeric, aromatic, chlorinated, brominated, or mixtures thereof. Examples of suitable anhydrides to use as the curing agent include, but are not limited to, hexahydrophthalic anhydride, methyl hexahydrophthalic anhydride, dodecyl succinic anhydride, nadic methyl anhydride, and mixtures thereof. In one embodiment, the anhydride is present in a blend or an adduct.

Those of ordinary skill in the art are familiar with the reaction mechanism of an epoxy resin and its curing agent. One example mechanism, using bisphenol A epoxy resin and a polyoxypropylene glycol based amine, is shown below:

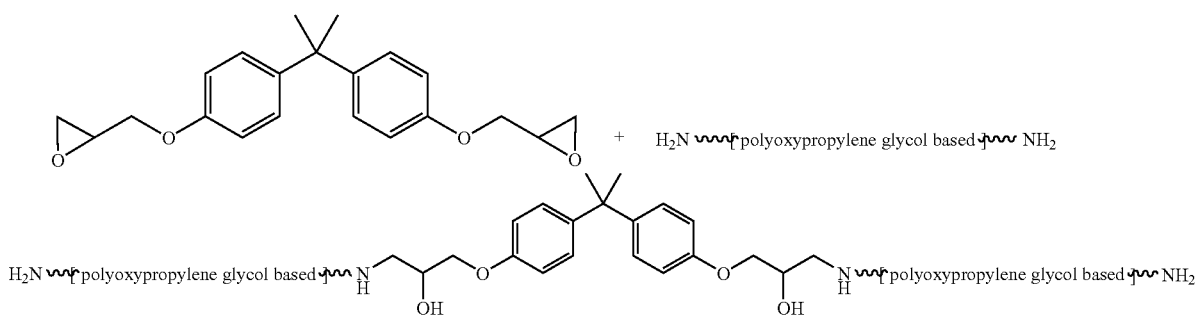

The amines further react with the epoxy groups to build up the molecular weight of the epoxy system.

The amount of curing agent to epoxy resin is any suitable amount that results in a completely cured epoxy system. For example, the curing agent to epoxy resin ratio may range from about 0.4 to about 1.4 (on an equivalent basis). In one embodiment, the curing agent to epoxy resin ratio is about 0.6 to about 1.2. In another embodiment, the ratio of curing agent to epoxy resin is about 0.6 to about 1.0.

The Acrylic Resin System

The IPN of the present invention may also be formed using a second polymeric system that is based on an acrylic resin. In particular, the acrylic resin system may be formed using an acrylate functional resin that is polymerized with an initiator.

Although some polymeric systems may be formed through self-polymerization, for example, such as polystyrene from styrene monomer, when activated by heat or the appropriate energy, most chain growth polymerizations involve an initiator. The choice of initiator of use in the present invention depends on each polymer component to be synthesized, and any available initiator capable of polymerizing the selected monomers, oligomers, or pre-polymers are generally also present in a precursor package. Suitable initiators can include, for example, free radical, cationic initiators, or ionic initiators. In cases where commercially available initiators contain inhibitors, the inhibitors may be separated and removed from the initiator by known methods prior to use.

Suitable initiators for use with the acrylic resin system include, but are not limited to, benzoyl peroxide, t-amyl peroxide, and mixtures thereof.

Forming the IPN

The IPNs of the present invention include at least two precursor packages, which correspond to the at least two polymeric systems described above. Each precursor package contains at least all the compounds necessary to form one of the polymeric systems of the IPN. Compounds that may be used in a precursor package include any monomers, oligomers, or pre-polymers that are to be attached to the polymeric system by polymerization.

For example, a precursor package for a first polymeric system may include a blocked polyurethane or polyurea prepolymer, a chain extender or curing agent, and, optionally, a "deblocking" agent. When referring to polymeric systems synthesized by step-growth polymerization, it should be understood that monomers, oligomers, and pre-polymers refer to any or all compounds with functional groups that participate in the polymerization and are attached to the resulting step-growth homopolymer or copolymer. A precursor package for the second polymeric system may include an epoxy resin or acrylic resin and its respective curing agent/catalyzing agent/initiator.

Interpenetrating polymer networks according to the present invention may typically be fabricated by a number of different methods known to one of ordinary skill in the art. Such fabrication processes include, but are not limited to, the following groups of methods.

(1) At least two sets of pre-synthesized oligomeric or polymeric components are mixed together by any standard method or any method known to one of ordinary skill in the art, such as, for example, melt mixing, solvating at least one component in a solution of at least one of the other components and a solvent or solvent mixture, or forming a solution mixture from at least two solutions, each containing at least one set of components and a solvent or solvent mixture. In cases where solvent mixing is involved, e.g., a coating composition including an IPN of the present invention, the majority of the solvent or solvent mixture should be removed after mixing, for example, by evaporation, boiling, precipitation of the non-solvent components, or the like, preferably such that the IPN contains less than 10 percent solvent, or more preferably is substantially free of solvent. The mixing process should allow for sufficiently intimate mixing of the components, for example, such that the at least two components are at least partially co-entangled. At least one of the at least two intimately mixed components can then be crosslinked. If both components are to be crosslinked, the crosslinking can occur simultaneously or sequentially.

(2) At least one non-polymerized precursor package can be incorporated into at least one other pre-synthesized oligomeric or polymeric component, which may or may not already be a crosslinked network, which incorporation can occur by any method that facilitates intimate mixing of the at least one precursor package with the at least one pre-synthesized component, for example, such as by swelling the at least one pre-synthesized component with the at least one precursor package, optionally under an applied pressure. Once the components are intimately mixed, the at least one precursor package can then be appropriately polymerized. In the event that the at least one pre-synthesized component is/are already crosslinked and a semi-IPN is desired, a further crosslinking reaction may not be necessary. Otherwise, at least one component of the at least one precursor package, now polymerized, may be crosslinked. Alternately, at least one component of the at least one precursor package may be crosslinked and polymerized simultaneously. If the at least one pre-synthesized component is/are not already crosslinked, then the at least one pre-synthesized component and the at least one polymerized precursor package component may be crosslinked simultaneously or sequentially. Alternately, if the at least one pre-synthesized component is/are not already crosslinked and a semi-IPN is desired, at least one of either set of components can be crosslinked.

(3) The at least two precursor packages can be mixed together by any method that facilitates intimate mixing of the compounds in the at least two precursor packages. The at least two intimately mixed precursor packages can then be polymerized and/or crosslinked in any order to form an IPN of the present invention. In one embodiment, the at least two precursor packages can be polymerized simultaneously or sequentially, but not crosslinked, yielding an intimately mixed blend of the at least two polymerized precursor package components. Then, one or more of the polymerized components can be crosslinked by an appropriate crosslinking method, and, if more than one of the polymerized components are to be crosslinked, the crosslinking can be done simultaneously or sequentially. Alternately, for one or more of the polymerized components, the crosslinking reaction may occur simultaneously with the polymerization reaction. In another embodiment, at least one of the at least two intimately mixed precursor packages can be polymerized and crosslinked in the presence of the other precursor package(s), after which the subsequent steps are similar to method #2 (after the initial intimate mixing).

It should be understood that certain rapid-forming IPN systems may need to be prepared using a quick-forming process, such as reaction injection molding (RIM), which is a processing method known for use in forming articles or materials out of rapidly curing polymer systems. Thus, the faster the formation of a given IPN system, the more suitable the use of RIM to process it. Indeed, if the IPN gelation time is less than about 60 seconds, preferably less than about 30 seconds, RIM is preferred over other conventional processing techniques. In the RIM process, at least two or more reactive, low-viscosity, liquid components are generally mixed, for example, by impingement, and injected under high pressure (e.g., at or above about 1200 psi) into a mold. The reaction times for RIM systems are much faster than in conventional lower-pressure mixing and metering equipment. The precursor packages used for the RIM process, therefore, are typically much lower in viscosity to better facilitate intimate mixing in a very short time.

(4) Each of the at least two precursor packages can be at least partially polymerized separately, and preferably simultaneously, at which point the at least partially polymerized precursor packages can be mixed together in a manner sufficient to result in intimate mixing of the components of the at least two, at-least-partially-polymerized components. In some urethane-epoxy systems, the total gelation time may range from about 40 to 100 seconds. The remainder of the polymerizations of the intimately mixed components then occur simultaneously, although one polymerization may be sufficiently complete before any other. Then, after all polymerizations are sufficiently complete, one or more of the polymerized components can be crosslinked by an appropriate crosslinking method, and, if more than one of the polymerized components are to be crosslinked, the crosslinking can be done simultaneously or sequentially. Alternately, for one or more of the polymerized components, the crosslinking reaction may occur simultaneously with the polymerization reaction.

In one embodiment, the precursor packages are mixed separately until a sufficient viscosity is attained, preferably from about 2,000 cPs to 35,000 cPs, more preferably from about 8,000 cPs to 30,000 cPs, most preferably from about 15,000 cPs to 26,000 cPs.

When forming an IPN including an epoxy resin system, any of the methods above can be used. Generally, the blocked polyurea or polyurethane prepolymer is mixed with its respective curing agent, e.g., a short chain diol or diamine, the epoxy resin, and the epoxy curing agent/catalyzing agent. The addition of heat, or a "deblocking" agent, is used to deblock the isocyanate groups, which react with the curing agent, and form urethane linkages or urea linkages depending on the type of curing agent used. The epoxy system simultaneously or sequentially reacts with its curing agent/catalyzing agent to form a cured epoxy system. In one embodiment, the IPN includes at least about 50 percent by weight of the polyurethane system, preferably about 80 percent or greater, more preferably about 90 percent or greater In the case where at least one of the polymeric systems is a thermoset material, the mixture of the two systems can be made in a number of ways, such as by grinding a cured epoxy polymer into a powder; mixing the proper proportion of the powdered epoxy polymer with the polyurethane or polyurea prepolymer to uniformly disperse the epoxy powder, but before polymerization, gelation, or solidification occurs; and shaping the mixture into a golf equipment component (e.g., a golf ball or portion thereof).

When forming an IPN of the invention that includes an acrylic resin, the blocked polyurethane or polyurea prepolymer is mixed with its respective curing agent, e.g., a short chain diol or diamine, an acrylate resin, and an initiator. As with the epoxy-based IPN, once the temperature is high enough to deblock the isocyanate groups in the prepolymer, urethane or urea linkages form (depending on the curing agent selected) to form the first system while the acrylate polymerization is initiated to form the second system. In the alternative, a "deblocking" agent may be used instead of, or in combination with, raising the temperature to deblock the isocyanate groups in the prepolymer. Once the isocyanate groups are deblocked, however, the IPN forms as the first and second polymeric systems cure simultaneously or sequentially. In one embodiment, an IPN according to the invention may include an acrylate homopolymer or copolymer or a homopolymer or copolymer containing a conjugated diene, especially polybutadiene, but may not include both.

If heat is used to deblock the isocyanate groups, the temperature required to expose the isocyanate groups is dependent on the type of blocking agent. A catalyst may be used to lower the deblocking temperature. Suitable catalysts include, but are not limited to, organometallic compounds, tertiary amines, quaternary ammonium salts, and combinations thereof. For example, dibutyltin dilaurate, dibutyltin diacetate, zinc naphthenate, lead naphthenate, bismuth salts, titanates, Co, Mg, Sr, and Ba salts of hexanoic, octanoic, naphthenic, and linolenic acids, metal acetylacetonates, and mixtures thereof are contemplated as catalysts for the deblocking mechanism. In one embodiment, a combination of organotin compounds and quaternary ammonium salts are used for catalysis to lower the deblocking temperature.

Crosslinking agents for each of the polymeric systems may be included in the precursor package to be mixed in with the systems initially, especially if they need to be externally activated, or may be added subsequent to the intimate mixing step, especially to avoid premature crosslinking by heating or exposure to activating energy or compounds. If activation is needed for crosslinking one or more of the at least two intimately mixed components, it is typically performed after an intimate mixing step. Activators for crosslinking may affect an agent or a part of the component itself, for example, such as a carbon-carbon double bond or a labile carbon-hydrogen bond, and generally include, but are not limited to, heat, light, UV radiation, x-rays, microwave radiation, and gamma radiation.

It should be understood that each method of crosslinking should be chosen to match up with the choice of starting materials and polymerization scheme used to synthesize each polymer system. It should also be noted that each method of crosslinking should typically not significantly degrade or be counterproductive toward polymerization or network formation of other components in the IPNs of the present invention.

A number of suitable polymerization and/or crosslinking techniques are contemplated to polymerize or crosslink the polymeric systems of the IPN. As used herein, the phrase "polymerization and/or crosslinking techniques" refers to the optional use of one or more initiators in conjunction with the chosen radiation cure technique or techniques. Thus, in one embodiment, the formation of an IPN of the present invention includes polymerizing and/or crosslinking one or more polymers, prepolymers, oligomers and/or monomers sequentially or simultaneously using one or more polymerization and/or crosslinking techniques. In particular, the formation of an IPN includes sequentially or simultaneously exposing one or more polymers, prepolymers, oligomers and/or monomers to:

1) an energy source selected from the group consisting of thermal/heat (i.e., microwave or infrared), UV radiation, visible radiation, electron beam radiation, x-ray radiation, gamma radiation, and combinations thereof, in the presence of an initiator; and 2) optionally one or more additional energy sources selected from the group consisting of thermal/heat (i.e., microwave or infrared), UV radiation, visible radiation, electron beam radiation, x-ray radiation, gamma radiation, and combinations thereof, in the presence of an initiator.

The initiator is optional and can be present or absent when electron beam radiation, x-ray radiation, thermal radiation, or gamma radiation is utilized in forming an IPN.

The energy source is selected such that its exposure to one or more polymers, prepolymers, oligomers and/or monomers does not adversely or detrimentally affect crosslinking and/or polymerization reactions or the characteristics of the final crosslinked and/or polymerized IPN. For example, an IPN including polyurea and acrylate requires low temperature for a fast cure of polyurea prepolymer, but curing the acrylate system generally requires heat, which adversely affects the curing of the polyurea by reducing the reaction rate and cosmetically changing cured polyurea. Electron beam radiation may be chosen to cure the acrylate because it can be utilized while avoiding the adverse or detrimental effects caused heat.

In one embodiment, the one or more additional energy source is electron beam radiation. In particular, the formation of an IPN includes sequentially or simultaneously exposing one or more polymers, prepolymers, oligomers and/or monomers to:
1) an energy source selected from the group consisting of thermal radiation/heat, UV radiation, visible radiation, electron beam radiation, x-ray radiation, gamma radiation, and combinations thereof; and
2) electron beam radiation.

The use of a low power electron beam source allows more efficient dosage of electrons and also helps prevent unwanted reactions with the final crosslinked/polymerized IPN.

The electron beam tube is a vacuum tube having a base end and a window end. An extended filament is disposed within the beam tube proximate to the base end. The filament generates electrons in conjunction with electron beam forming electrodes. The electrons from the filament (i.e., electron beam source) are directed toward and through the beam window of the electron beam tube. A low power electron beam tube is preferred. The beam energy from a low power beam tube is below about 125 kV (kilovolts), typically between about 15-80 kV (or any value therebetween), more typically between about 20-75 kV and most typically between about 30-65 kV. The voltage to the power supply (input voltage from about 10 to about 1,000 volts) is preferably about 110 volts (or less) and its operating power is preferably about 100 watts (or less). However, the output voltage of the beam tube may be between 20-100 kV or any value therebetween. Likewise, the operating power of the electron beam may be from about 10-1,000 watts or any value therebetween.

The amount of time required for the systems to cure is variable, depending on the type of constituents in the two polymeric systems, the thickness of the material, the cure temperature, and other factors known to those of skill in the art. In one embodiment, the cure time is about 5 seconds to about 1 hour. In another embodiment, the cure time is about 15 seconds to about 45 minutes, preferably about 30 seconds to about 30 minutes. Alternatively, the cure time can be 1 hour or more. For example, the IPNs of the invention may be cured overnight at room temperature.

In addition, the amount of radiation energy needed to sufficiently initiate polymerization, cure, and/or crosslink the composition depends upon a number of factors including, for example, the chemical identity of the composition and precursors, as well as the initiator, radiation source chosen, and length of exposure time of the polymer components to the energy source. As discussed above, thermal radiative sources include infrared and microwave sources. Conditions for thermal or heat initiated polymerizations typically are from about 35° C. to about 300° C., preferably from about 50° C. to about 200° C. and for a time of about fractions of minutes to about thousands of minutes. Examples of thermal free radical initiators include azo compounds, peroxides, persulfates (e.g., potassium persulfate, sodium persulfate, and ammonium persulfate), and redox initiators.

If actinic radiation is utilized, such as ultraviolet or visible light, a photoinitiator may be utilized. Upon being exposed to ultraviolet or visible light, the photoinitiator generates a free radical source or a cationic source. This free radical source or cationic source then initiates the polymerization. In free radical processes, however, an initiator is optional when a source of electron beam radiation, x-ray or gamma radiation energy is utilized. Thus, an initiator may be present or absent when the energy source is electron beam radiation, x-ray or gamma radiation energy. Gamma radiation and electron beam radiation are useful because of their excellent penetration at ambient temperature allows more control in the quiescent conditions. Gamma radiation and electron beam radiation are also advantageous because they require minimal cooling of the cured inks (the curing is done at ambient or room temperature), the ink are almost instantaneously cured, obviate or reduce the need for costly ventilating systems, and, in the case of low power electron beam radiation, require low energy to cure. Additionally, curing by gamma radiation or electron beam radiation allows the combination of several ink compositions in the same curing cycle, which may not be possible for thermal curing because the different ink compositions may require different temperatures or cure times.

Suitable photoinitiators include, for example, those that absorb in the wavelength range from about 0.001 nm to 700 nm, preferably from about 100 nm to about 650 nm, more preferably from about 190 nm to about 600 nm. Photoinitiators include peroxides, azo compounds, quinines (e.g., substituted and unsubstituted anthraquinones, camphor quinone, alkyl-camphorquinone), benzophenones (e.g., 4-methylbenzophenone, benzophenone, 4,4'-bisdimethylamine-benzophenone, 1-hydroxycyclohexyl phenyl ketone), nitroso compounds, acyl halides, hydrazones, mercapto compounds, pyrylium compounds, triacylimidazoles, organophosphorus compounds (e.g., acylphosphine oxides, 2,4,6-trimethylbenzoyldiphenylphosphine oxide), bisimidazoles, chloroalkyltriazines, benzoates (e.g., ethyl 4-(dimethylamino)benzoate), benzoyl compounds (e.g., acrylic or methacrylic [(2-alkoxy-2-phenyl-2-benzoyl)ethyl]esters, 4-benzoyl-4'-methyldiphenyl sulfide, 1-benzoylcyclohexanol), benzoin ethers (e.g., substituted and unsubstituted $C_1$-$C_8$ alkyl benzoin ethers, such as benzoisobutyl ether), benzil ketals (e.g., benzyldimethyl ketal), thioxanthones (e.g., 2-isopropylthioxanthone and 4-isopropylthioxanthone), acetophenone derivatives (e.g., 2,2-dimethoxy-2-phenyl-acetophenone, 2,2-diethoxyacetophenone, 2,2-diacetoxyacetophenone, chlorinated acetophenone, hydroxyacetophenone), ketones (e.g., 2-methyl-1-(4-[methylthio]phenyl)-2-(4-morpholinyl)-1-propanone, 2-hydroxy-2-methyl-1-phenylpropan-1-one, 4-(2-hydroxyethoxy)phenyl 2-hydroxy-2-propyl ketone, 2-benzyl-2-dimethylamino-1-(4-morpholinophenyl)furan-1-one), metallocenes (e.g., Group VIII metallocenes, perfluorinated diphenyltitanocenes), hexafluorophosphate salts (e.g., ($\eta^5$-cyclopentadienyl)($\eta^6$-isopropylphenyl)iron(II) hexafluorophosphate, triphenylsulfonium hexafluorophosphate), sulfonium salts, diacrylates (e.g., butanediol diacrylate, dipropylene glycol diacrylate, hexanediol diacrylate, 4-(1,1-dimethylethyl)cyclohexyl acrylate, trimethylolpropane triacrylate and tripropylene glycol diacrylate), polyols (e.g., polyethylene glycol), pyrollidones (e.g., N-vinyl pyrollidone) and mixtures thereof.

Examples of commercially available photoinitiators include, but are not limited to, Vicure 10, 30 (made by Stauffer Chemical), Irgacure 184, 651, 2959, 907, 369, 1700, 1800, 1850, 819 (made by Chiba Specialty Chemicals), Darocurel 173 (made by EM Chemical), Quantacure CTX, ITX (made by Aceto Chemical), Lucirin TPO (made by BASF). Other examples of suitable photoinitiators are described in, for example, U.S. Pat. No. 6,500,495, the entirety of which is incorporated herein by reference.

Cationic initiators include Group IA or Group IIA organo compounds, aryl sulfonium salts, hexafluorometallic salts, Bronsted acids, Lewis acids or mixtures thereof. In particular, cationic initiators include sec-butyllithium, n-butyllithium, other ($C_1$-$C_{10}$)alkyllithiums, aryllithiums, sulfonic acids (e.g. sulfuric acid), phosphoric acid, perchloric acid, triflic acid, $BF_3$, aluminum halides (e.g., $AlCl_3$, $AlBr_3$), triarylsulfonium salts, diaryliudonium salts or mixtures thereof.

Peroxide and organic peroxide initiators typically are R—O—O—$R_1$, wherein R and $R_1$ are each independently selected from the group consisting of hydrogen, ($C_1$-$C_{20}$) alkyl, ($C_1$-$C_{20}$)alkylene, ($C_1$-$C_{20}$)alkylyne, ($C_1$-$C_{20}$)cycloalkyl, and substituted or unsubstituted ($C_6$-$C_{24}$)aryl, wherein aryl may be phenyl, naphthyl, biphenyl, thienyl or pyridyl and the aryl moiety may in each case be mono- to trisubstituted by F, Cl, Br, I, OH, $CF_3$, $NO_2$, CN, $OCF_3$, O—($C_1$-$C_{10}$)alkyl, $NH_2$, NH($C_1$-$C_6$)alkyl, COOH, COO($C_1$-$C_6$)alkyl. As used herein, "substituted" refers to additional moieties or groups that are attached to and found in R and $R_1$, which includes, but are not limited to F, Cl, Br, I, OH, $CF_3$, $NO_2$, CN, $OCF_3$, O—($C_1$-$C_{10}$)alkyl, $NH_2$, NH($C_1$-$C_6$)alkyl, COOH, COO($C_1$-$C_{10}$)alkyl, ($C_1$-$C_{10}$)alkyl, ($C_2$-$C_{10}$)alkenyl, ($C_2$-$C_{10}$)alkynyl, ($C_1$-$C_{10}$)alkyl-COOH, ($C_1$-$C_{10}$)alkyl-aryl, wherein aryl may be phenyl, naphthyl, biphenyl, thienyl or pyridyl and the aryl moiety may in each case be mono-, di- or tri-substituted by F, Cl, Br, I, OH, $CF_3$, $NO_2$, CN, $OCF_3$, O—($C_1$-$C_{10}$)alkyl, $NH_2$, NH($C_1$-$C_6$)alkyl, COOH, COO($C_1$-$C_6$)alkyl.

Examples of peroxide and organic peroxide initiators include, but are not limited to, di(2-tert-butyl-peroxyisopropyl)benzene peroxide or bis(tert-butylperoxy)diisopropylbenzene, 2,5-di-(tert-butylperoxy)-2,5-dimethyl hexane, n-butyl-4,4-bis(tert-butylperoxy)valerate, lauryl peroxide, 1,1-bis(tert-butylperoxy)-3,3,5-trimethylcyclohexane, dicumyl peroxide, di-tert-butyl peroxide, di-tert-amyl peroxide, benzoyl-5-peroxide, tert-butyl hydroperoxide, benzoyl peroxide, acetyl peroxide, decanoyl peroxide, dicetyl peroxydicarbonate, di(4-tert-butylcyclohexyl) peroxydicarbonate (available under the trade designation PERKADOX 16, from Akzo Chemicals, Inc., Chicago, Ill.), di(2-ethylhexyl) peroxydicarbonate, tert-butylperoxypivalate (available under the trade designation LUPERSOL 11, from Lucidol Division, Atochem North America, Buffalo, N.Y.) and tert-butylperoxy-2-ethylhexanoate (available under the trade designation TRIGONOX 21-C50, from Akzo Chemicals, Inc., Chicago, Ill.).

Azo compounds include, but are not limited to, 4,4'-azobis (isobutyronitrile), 4,4'-azobis(cyanovalerate), 4,4'-azobis (cyanovaleric acid), 2,2'-azobis(4-methoxy-2,4-dimethylvaleronitrile) (available under the trade designation VAZO 33); 2,2'-azobis(2-amidinopropane) dihydrochloride (available under the trade designation VAZO 50); 2,2'-azobis(2,4-dimethylvaleronitrile) (available under the trade designation VAZO 52); 2,2'-azobis(isobutyronitrile) (also known as AIBN, available under the trade designation VAZO 64); 2,2'-azobis-2-methylbutyronitrile (available under the trade designation VAZO 67); 1,1'-azobis(1-cyclohexanecarbonitrile) (available under the trade designation VAZO 88), all of which are available from E.I. Dupont de Nemours and Company, Wilmington, Del., and 2,2'-azobis(methylisobutyrate) (available under the trade designation V-601 from Wako Pure Chemical Industries, Ltd., Osaka, Japan), and other azo compounds.

In one embodiment, the free radical initiator is an inhibitor-containing peroxide, such as 2,6-di-tert-butylbenzoquinone, 2,6-di-tert-butyl-4-methylene-2,5-cyclohexadiene-1-one, 2,6-di-tert-butyl-4-hydroxybenzaldehyde, 2,6-di-tert-butyl-4-isopropylphenol, 4,4'-methylene bis-(2,6-di-tert-butylphenol), 1,2-bis-(3,5-di-tert-butyl-4-hydroxyphenyl)ethane, 2,3,5,6-tetramethylbenzoquinone, 2-tert-butylhydroquinone, 2,2'-methylenebis-(4-methyl-6-tert-butylphenol), and the like, and mixtures thereof. The initiator, i.e., photoinitiator, free-radical initiator or cationic initiator, is generally present in an amount sufficient to initiate a polymerization resulting in a polymer having a number average molecular weight suitable for use in golf balls, which is typically from about 1,000 to about 10,000,000 grams/mole. Alternatively, the initiator (i.e., photoinitiator, free radical initiator or cationic initiator) may be present in an amount greater than about 0.01 parts per hundred of the polymer component, preferably from about 0.01 to about 15 parts per hundred of the polymer component, and more preferably from about 0.1 to about 10 parts per hundred of the polymer component, and most preferably from about 0.2 to about 5 parts per hundred of the total polymer component. It should be further understood that heat often facilitates initiation of the generation of free radicals in the aforementioned compounds.

In another embodiment, the initiator is selected to suit or match the radiation cure technique that is used to initiate the polymerization process. For example, a photoinitiator is used when ultraviolet ("UV") curing is the radiation cure technique. In another example, a thermal free radical initiator is used when thermal or heat curing is the radiation cure technique. It is possible to use a photoinitiator in thermal or heat curing, or a thermal free radical initiator in UV curing. Thus, the present invention encompasses the use of any initiator in conjunction with any radiation cure technique so long as the initiator that is chosen initiates the polymerization process.

In one embodiment, the free-radical source may alternatively or additionally be one or more of an electron beam, visible light, UV or gamma radiation, x-rays, or any other high-energy radiation source capable of generating free radicals. Thus in one example, an initiator may or may not be utilized when gamma radiation, x-ray, or electron beam radiation is the radiation cure technique. Such initiators form free radicals and/or cations that initiate polymerization upon exposure to gamma radiation, x-ray or electron beam radiation.

IPN as a Coating Composition

As briefly addressed above, the IPNs of the present invention may also be used as a coating. The method of forming the IPN when it is intended to be used as a coating is similar to that described above, however, the mixture of components is prepared in a solution with a solvent such as methyl isobutyl ketone, toluene, and the like. The solvent may be used in an amount of about 0.05 to about 4 pounds solvent per pound of resin. In one embodiment, the solvent to resin ratio is about 0.08 to about 3 by pound weight. In another embodiment, the solvent to resin ratio is about 1 pound to about 2.5 by pound weight. The ratio of the first polymeric system, i.e., the polyurethane or polyurea prepolymer, to the second polymeric system, i.e., the epoxy resin or acrylate resin, is preferably about 0.1 to about 1.0 by weight. In one embodiment, the ratio of the prepolymer to epoxy resin or acrylate resin is about 0.2 to about 0.8 by weight. In another embodiment, the prepolymer to epoxy or acrylate resin ratio is about 0.3 to about 0.7 by weight.

The solution is applied to the surface of the golf equipment, e.g., an outermost cover of a golf ball, a golf club head, a golf shoe, a golf bag, by any suitable method. For example, dipping, spraying, and brushing are application methods contemplated by the present invention. Once applied, the solution is cured in a manner similar to the one discussed above. For example, the coated surface may be exposed to an elevated temperature to deblock the isocyanate groups in the polyurethane or polyurea prepolymer. The elevated temperature will also activate the epoxy or acrylate resin reaction so that the second system will cure simultaneously with the polyurethane or polyurea system to form the IPN of the present invention. As mentioned above, the temperature required for deblocking the isocyanate groups and initiating the epoxy or acrylate resin reaction is a function of the type of blocking agent, the type and amount of curing agents/catalyzing agents/initiators, as well as other factors known to those of skill in the art.

Furthermore, as discussed above, a catalyst may be added to the solution before it is applied to decrease the temperature and/or time required to deblock the isocyanate groups.

As those of ordinary skill in the art are aware, the cure time is highly dependent on the temperature and constituents of the composition. For example, the cure time for an IPN coating composition of the present invention can be from about 5 seconds to 24 hours, from about 5 seconds to about 1 hour, from about 5 seconds to about 30 minutes, from about 5 seconds to about 15 minutes, from about 5 seconds to about 5 minutes, from about 5 seconds to about 2 minutes, or from about 5 seconds to about 30 seconds.

Additives

Other compounds useful in polymerization of the individual polymeric systems of the IPNs of the present invention may also be added to a precursor package as the situation warrants providing that the compounds are not significantly counterproductive toward polymerization or network formation of other components in the IPNs of the present invention. Such compounds should generally be chosen based on the specifics of the starting materials, polymerization scheme, and crosslinking reaction used to synthesize each polymer component or network.

For example, accelerators or catalysts may be included in a precursor package to control the speed and/or duration of polymerization and/or crosslinking reaction(s), if a particular component is crosslinked. Any accelerator or catalyst known to one of ordinary skill in the art or any standard accelerator or catalyst may be used in a precursor package in the present invention. It should be understood, however, that the accelerator or catalyst used in a given precursor package should be chosen based on the specifics of the starting materials, polymerization scheme, and crosslinking reaction, used to synthesize each polymer component or network. For example, the catalyst may be the same or different from the catalyst used to decrease the temperature required to deblock the isocyanate groups in the first polymeric system.

Suitable catalysts include, but are not limited to, Lewis acids, for example, such as halides of boron, aluminum, indium, tin, antimony, any transition metal, particularly vanadium, zinc, zirconium, indium, manganese, molybdenum, cobalt, titanium, or tungsten, or mixtures thereof. Exemplary catalysts include chlorides and fluorides of boron, aluminum, or titanium, or mixtures thereof, and more preferably include boron trifluoride, aluminum trichloride, titanium (III) or (IV) chloride, or mixtures thereof. Other suitable catalysts include, but are not limited to, Lewis bases, inorganic bases, primary and secondary amines, and amides. Other catalysts include, but are not limited to, oxides, such as magnesium oxide, or aluminum oxide; tertiary amines, such as N,N-dimethylaminopyridine, or benzyldimethylamine; imidazoles, such as 2-ethyl-4-methylimidazole; and phosphines, such as triphenylphosphine, or tributylphosphine. Catalysts may also include mixtures of any of these listed compounds with one or more components.

Suitable accelerators include, but are not limited to, sulfonamides, such as benzenesulfonamide; ureas, such as 3-(p-chlorophenyl)-1,1-dimethylurea, or 3-(3,4-dichlorophenyl)-1,1-dimethylurea; and acids, such as phthalic acid, benzoic acid, or p-toluenesulfonic acid. In one embodiment, a carboxylic acid compound may be used as an accelerator, particularly when the first polymeric system is polyurethane-based.

Optionally, additional curing agents may also be added to a precursor package to facilitate the curing of a particular polymeric system. Suitable chain extenders may vary depending on the polymers or networks included in the IPN, but, for step-growth or condensation polymers or epoxies, suitable curing agents generally include polyols, including, for example, telechelic diols, telechelic alkanediols, such as ethylene glycol, 1,4-butanediol, 1,6-hexanediol, and the like, or mixtures thereof; a polyamine, including, for example, telechelic diamines, telechelic alkanediamines, such as ethylenediamine, propylenediamine, and the like, or mixtures thereof; a cyclic polyol or polyamine, for example, such as diaminocyclohexane; or mixtures thereof. Suitable crosslinkers may also vary depending or networks included in the IPN, and include, but are not limited to any chain extender; a disulfide or polysulfide; a diisocyanate or polyisocyanate; excess diisocyanate or polyisocyanate; compounds containing or able to generate or activate a free radical; a form of energy able to generate or activate a free-radical, for example, such as heat, visible light, ultraviolet light, x-rays, γ-rays, other energy or radiation, or a mixture thereof; divalent or multivalent salts; or a mixture thereof.

Other curing agents may be reactive upon addition to a precursor package or to a polymer component or may require activation of some sort to begin curing. Certain IPN precursors, prepolymers, or polymers, when the proper activators or initiators are used, as understood by those of ordinary skill in the art, can undergo self-polymerization, to form higher molecular weight polymers, or self-crosslinking, to form a network structure, or both. These self-reactions advantageously may be facilitated by one or more catalysts.

Certain curing agents may already be present in a precursor package as they may derive from a functional group or active site on a polymer component. Other curing agents may also be comonomers, for example, such as multifunctional compounds in step-growth polymerization reactions, such as polyamines, polyisocyanates, polyols, or the like, or mixtures thereof, or compounds containing two sites across which an addition polymerization may proceed, such as conjugated dienes, non-conjugated dienes, divinyl compounds, conjugated or non-conjugated cyclic compounds, divalent or multivalent salts, or mixtures thereof. One of ordinary skill in the art should be able to determine for a particular IPN system whether certain curing agents function as chain extenders, crosslinkers, or both. It should be understood that any curing agents already present in a precursor package or useful in another capacity in the polymer component of the IPN system shall not be considered additional curing agents for that polymer component.

Fillers may also be used in the IPNs of the present invention. Fillers typically include processing aids or compounds to affect rheological and mixing properties, the specific gravity (i.e., density-modifying fillers), the modulus, the tear strength, reinforcement, and the like. A density adjusting filler may be used to control the moment of inertia, and thus the initial spin rate of the ball and spin decay. Fillers are typically polymeric or inorganic in nature, and, when used, are typically present in an amount from about 0.1 to 50 weight percent of the layer in which they are included. Any suitable filler available to one of ordinary skill in the art may be used. Exemplary fillers include, but are not limited to, precipitated hydrated silica; clay; talc; glass fibers; aramid fibers; mica; calcium metasilicate; barium sulfate; zinc sulfide; lithopone; silicates; silicon carbide; diatomaceous earth; polyvinyl chloride; carbonates such as calcium carbonate and magnesium carbonate; metals such as titanium, tungsten, aluminum, bismuth, nickel, molybdenum, iron, copper, boron, cobalt, beryllium, zinc, and tin; metal alloys such as steel, brass, bronze, boron carbide whiskers, and tungsten carbide whiskers; metal oxides such as zinc oxide, iron oxide, aluminum oxide, titanium oxide, magnesium oxide, and zirconium oxide; particulate carbonaceous materials such as graphite, carbon black, cotton flock, natural bitumen, cellulose flock, and leather fiber; micro balloons such as glass and ceramic; fly ash; cured, ground rubber; or combinations thereof.

Various foaming agents or blowing agents may also be used in the IPNs of the present invention. Foamed polymer blends may be formed by blending ceramic or glass microspheres with polymer material. Polymeric, ceramic, metal, and glass microspheres may be solid or hollow, and filled or unfilled.

Additional materials conventionally included in golf ball compositions may also be included in the IPNs of the present invention. These additional materials include, but are not limited to, coloring agents, reaction enhancers, whitening agents, UV absorbers, hindered amine light stabilizers, defoaming agents, processing aids, and other conventional additives. Stabilizers, softening agents, plasticizers, including internal and external plasticizers, impact modifiers, foaming agents, excipients, reinforcing materials and compatibilizers can also be added to any composition of the invention. All of these materials, which are well known in the art, are added for their usual purpose in typical amounts.

IPN Properties

Compatibility of the IPNs of the present invention can be evidenced by comparing experimentally measured properties, such as the relative glass transition temperatures (or the difference between them, denoted as $\Delta T_g$) or the relative crystallinity or crystalline perfection (as represented by the area under the melting endotherm), if at least one component of the IPN is crystallizable. These properties may be experimentally observed by a number of different instruments, such as a differential scanning calorimeter ("DSC") or dynamic mechanical analyzer ("DMA") or dynamic mechanical thermal analyzer ("DMTA").

Preferably, the formation of an IPN reduces the $\Delta T_g$ between at least two of the polymeric components of the IPN at least about 5 percent as compared with the $\Delta T_g$ between a polymer blend containing the same two polymeric components. In one embodiment, the formation of an IPN reduces the $\Delta T_g$ between at least two of the polymeric components of the IPN at least about 10 percent over that of a polymer blend containing the same two polymeric components. In another embodiment, the formation of an IPN reduces the $\Delta T_g$ between at least two of the polymeric components of the IPN at least about 20 percent as compared to a polymer blend including the same two polymeric components. In yet another embodiment, the formation of an IPN reduces the $\Delta T_g$ between at least two of the polymeric components by at least about 35 percent, preferably by at least about 50 percent, and more preferably by at least about 75 percent as compared with a polymer blend including the same two polymeric components. In yet another embodiment, the formation of an IPN yields only one observable $T_g$ for the at least two polymeric components.

Alternately, in the case where at least two of the polymeric components of the IPN associate or interact strongly in a polymer blend, especially through hydrogen-bonding, ionic aggregation, chelation, or the like, the formation of an IPN can increase the $\Delta T_g$ between the at least two polymeric components in the IPN, in some cases at least about 5 percent, as compared with the $\Delta T_g$ between a polymer blend containing the same at least two polymeric components. In one such alternate embodiment, the formation of an IPN increases the $\Delta T_g$ between at least two of the polymeric components of the IPN at least about 10 percent. In another such alternate embodiment, the formation of an IPN increases the $\Delta T_g$ between at least two of the polymeric components of the IPN at least about 20 percent.

Preferably, the formation of an IPN reduces the absolute value of the area under the melting endotherm, often called $\Delta H_f$, of at least one of the crystallizable polymeric components of the IPN at least about 5 percent less than the area under the melting endotherm of a polymer blend of the same ratio of the at least one crystallizable polymeric component. In one embodiment, the formation of an IPN reduces $\Delta H_f$ of at least one of the crystallizable polymeric components of the IPN at least about 10 percent compared to the blend. In another embodiment, the formation of an IPN reduces $\Delta H_f$ of at least one of the crystallizable polymeric components of the IPN at least about 15 percent compared to the blend. In various other embodiments, the formation of an IPN reduces $\Delta H_f$ of at least one of the crystallizable polymeric components of the IPN at least about 25 percent compared to the blend, at least about 50 percent compared to the blend, and at least about 75 percent compared to the blend. In yet another embodiment, the formation of an IPN results in at least one of the crystallizable polymeric components being substantially free of crystallinity, as measured by $\Delta H_f$.

When performing DMA or DMTA experiments, ASTM D4065-95 was followed in analyzing sample material responses. A heating rate of no more than about 2° C./min was employed for these tests, and the thicknesses of the samples were kept within about 5 percent of the average thickness. When performing DSC experiments to measure the glass transition temperature, $T_g$, or the melting temperature, $T_{pm}$, of samples, ASTM D3418-99 was followed, in which the numerical value of $T_g$ represents the median temperature of the transition and the numerical value of $T_{pm}$ represents the peak extremum of the melting endotherm. When performing DSC experiments to measure the degree of crystallinity or the area under the melting endotherm, $\Delta H_f$, ASTM D3417-99 was followed.

As is very often the case in multi-polymer blend systems, two of the polymeric components may be immiscible or partially miscible, such that phase separation occurs to a certain extent. This phase separation may be visible to one of ordinary skill in the art (macrophase separation) or may only be observable through specialized characterization techniques designed to probe regions of less than about 500 microns (microphase separation). At the meeting of the at least two phases, there is a phase boundary that defines the edge of each phase. The average size of the phases of each phase separated component can be experimentally measured using, for example, atomic force microscopy, scanning electron microscopy, transmission electron microscopy, or other appropriate characterization apparatus.

In a preferred embodiment, the formation of an IPN, in which two of the polymeric components may be immiscible or partially miscible, results in an average phase size of each phase separated component that can be considerably less than the average phase size of each phase separated component in a blend of two or more of the components. In one embodiment, the formation of an IPN results in an average phase size of each phase separated component being at least about 10 percent smaller than a blend of the two components. In another embodiment, the formation of an IPN results in an average phase size of each phase separated component being at least about 20 percent smaller than a blend of the two components. In various other embodiments, the formation of an IPN results in an average phase size of each phase separated component being at least about 35 percent smaller than a blend of the two components, at least about 60 percent smaller than a blend of the two components, and at least about 85 percent smaller than a blend of the two components. In some cases, IPN formation can result in complete miscibility of the system, resulting in no discernible phase boundaries, while the components may have been immiscible or only partially miscible when in a blend.

In one embodiment, the formation of an IPN increases at least one of the following measurable quantities: the area under the loss modulus peak, represented by a local maximum in E″, or loss tangent peak, represented by a local maximum in tan δ; the temperature range over which the loss modulus or loss tangent peak extends; the full-width at half-maximum height (FWHM) of the loss modulus or loss tangent peak; or the number of loss modulus or loss tangent peaks over a given temperature interval, as compared to the same value(s) measured for a blend of the same ratio of the at least two IPN components. In another embodiment, the formation of an IPN increases at least one of the aforementioned measurable quantities by at least about 2 percent, as compared to the same value(s) measured for a blend of the same ratio of the at least two IPN components. In yet another embodiment, the formation of an IPN increases at least one of the aforementioned measurable quantities by at least about 5 percent, as compared to the same value(s) measured for a blend of the same ratio of the at least two IPN components. In still another embodiment, the formation of an IPN increases at least one of the aforementioned measurable quantities by at feast about 10 percent, as compared to the same value(s) measured for a blend of the same ratio of the at least two IPN components. In various other embodiments, the formation of an IPN increases at least one of the aforementioned measurable quantities by at least about 25 percent, by at least about 50 percent, and by at least about 75 percent, as compared to the same value(s) measured for a blend of the same ratio of the at least two IPN components. Alternately, instead of a comparison to the value(s) measured for a blend of the same ratio of the at least two IPN components, at least one of the aforementioned measure quantities can be compared to an uncrosslinked polymer of one of the at least two IPN components, a crosslinked polymer of one of the at least two IPN components, a random, block, graft, or other type of copolymer of at least two of the individual polymer components of the IPN, a crosslinked copolymer of at least two of the individual polymer components of the IPN, or some combination thereof.

It is also desirable for the cover, or the outermost layer of the cover if the cover has a plurality of layers, to exhibit a high shear resistance, which is manifest as the ability of a material to maintain its mechanical stability and integrity upon the application of a shear stress to that material. A "shear resistance rating" is a qualitative, or relative, scale for assessing the relative shear resistance of a material. The lower the shear resistance rating is, the higher the shear resistance of the material. For painted golf ball cover materials, the shear resistance rating categories from 1 to 5 are listed and described in the table below:

| Description | Rating |
| --- | --- |
| No visible damage to cover or paint | 1 |
| Paint damage only | 2 |
| Slight cover shear and/or paint damage observed | 3 |
| Moderate cover shear; fraying; and/or slight material removed | 4 |
| Extensive cover shear; heavy material removed; and/or severe material clumping | 5 |

The shear resistance rating can be determined by using a Miya™ mechanical Golf Swing Machine, commercially available from Miyamae Co., Ltd., of Osaka, Japan, to make two hits on each of about 6 to 12 substantially identical golf balls of substantially the same composition with either a sand wedge or a pitching wedge. First, the test conditions are adjusted and verified so that a control golf ball having a balata cover produces a rating of 5 on the shear resistance rating scale above. Following the calibration procedure, each experimental golf ball is tested and assigned a rating based upon visible manifestations of damage after being struck. The shear resistance rating for a golf ball cover layer of a given composition represents a numerical average of all the tested substantially identical golf balls. One alternative way to test shear resistance of a golf ball cover involves using player-testing and evaluating the results after the ball is struck multiple times with wedges and/or short irons.

In a preferred embodiment, the formation of an IPN in a layer of a golf ball according to the present invention increases the shear resistance of the cover layer of that golf ball, preferably resulting in a decrease in the shear test rating of at least 1, more preferably resulting in a decrease of at least 2, compared to the cover layer material of a conventional golf ball that is substantially free of IPN and that is made of the same components as the IPN. In that embodiment, it is preferred that the shear resistance of the cover layer of that golf ball has a shear test rating of 3 or less, most preferably 2 or less.

Advantageously, the formation of an IPN in a golf ball layer may also increase the resistance to moisture penetration of that layer. IPN formation in that layer may also provide reduction in the water vapor permeability of a golf ball layer having an IPN therein. The reduced exposure of golf ball materials to water or water vapor helps inhibit degradation of or maintain the mechanical and/or chemical properties of those materials. This is particularly true when the water or moisture can facilitate degradation of molecular weight or mechanical properties of one or more components of the materials within the golf ball.

The ranges of values of several golf ball or material properties listed herein can vary, even outside their recited ranges, by the inclusion of IPNs according to the invention and, if necessary, by selectively varying at least one other property mentioned herein. Examples of such golf ball or material properties whose ranges can be varied by inclusion of an IPN include, but are not limited to, tensile or flexural modulus and impact resistance.

Golf Ball Construction

The compositions of the present invention may be used with any type of ball construction including, but not limited to, one-piece, two-piece, three-piece, and four-piece designs, a double core, a double cover, an intermediate layer(s), a multilayer core, and/or a multi-layer cover depending on the type of performance desired of the ball. That is, the compositions of the invention may be used in a core, an intermediate layer, and/or a cover of a golf ball, each of which may have a single layer or multiple layers. As used herein, the term "multilayer" means at least two layers.

For instance, the core may be a one-piece core or a multilayer core, both of which may be solid, semi-solid, hollow, fluid-filled, or powder-filled. As used herein, the term "fluid" includes a liquid, a paste, a gel, a gas, or any combination thereof. A "fluid-filled" golf ball center or core according to the invention also includes a hollow center or core. A multilayer core is one that has an innermost component with an additional core layer or additional core layers disposed thereon. In addition, when the golf ball of the present invention includes an intermediate layer, this layer may be incorporated with a single or multilayer cover, a single or multipiece core, with both a single layer cover and core, or with both a multilayer cover and a multilayer core. The intermediate layer may be an inner cover layer or outer core layer, or any other layer(s) disposed between the inner core and the outer cover of a golf ball. As with the core, the intermediate layer, if included, and the cover layer may include a plurality of layers. It will be appreciated that any number or type of intermediate and cover layers may be used, as desired. For example, the intermediate layer may also be a tensioned elastomeric material wound around a solid, semi-solid, hollow, fluid-filled, or powder-filled center.

Figure 2:
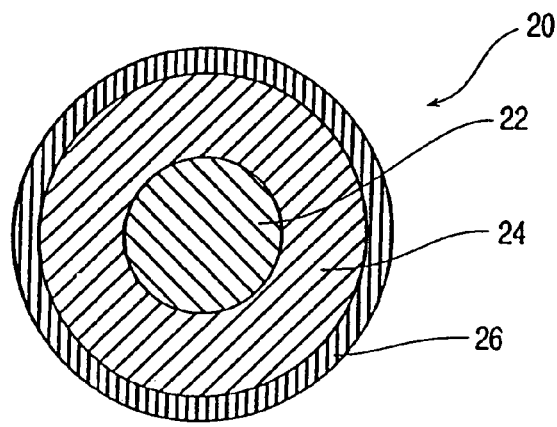
FIG. 2 illustrates a multi-layer golf ball including a center, an intermediate layer disposed over the center, and a cover layer disposed over the intermediate layer, in which at least one part of the golf ball includes an IPN.

Referring to FIG. 1, a golf ball 10 of the present invention can include a center 12 and a cover 16 surrounding the center 12. Referring to FIG. 2, a golf ball 20 of the present invention can include a center 22, a cover 26, and at least one intermediate layer 24 disposed between the cover and the center. In one embodiment, the intermediate layer 24 is disposed within the core, which also includes a center 22 and may optionally include a wound layer (not shown). In another embodiment, the intermediate layer 24 is disposed outside of the core, which may optionally include a wound layer (not shown), but which is disposed under the cover layer 26. Each of the cover and center layers in FIG. 1 or 2 may include more than one layer, i.e., the golf ball can be a conventional three-piece wound ball, a two-piece ball, a ball having a multi-layer core and an intermediate layer or layers, etc. Also, FIG. 3 shows a golf ball 30 of the present invention including a center 32, a cover 38, and an intermediate layer 34 located within the core 33.

Figure 3:
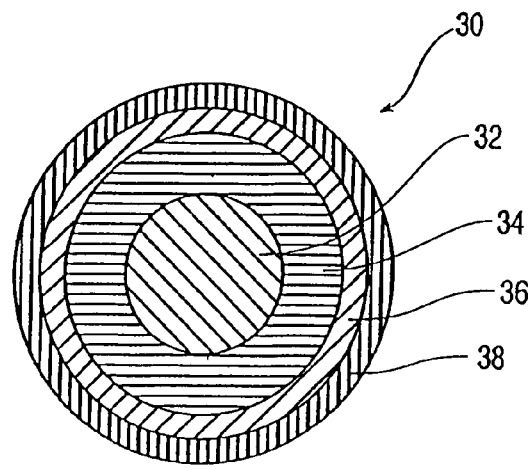
FIG. 3 illustrates a multi-layer golf ball including a core, an intermediate layer, and a cover layer disposed over the core, in which at least one part of the golf ball includes an IPN.

Alternately, also referring to FIG. 3, a golf ball 30 of the present invention can include a center 32, a cover 38, and an intermediate layer 36 disposed between the cover and the core 33. Although FIG. 3 shows golf balls with only one intermediate layer, it will be appreciated that any number or type of intermediate layers may be used whether inside or outside the core, or both, as desired. Further, any of the figures detailed herein may include embodiments wherein an optional wound layer is disposed between the center and the core of the golf ball.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Layer Compositions

Golf Ball Core Layer(s)

The cores of the golf balls formed according to the invention may be solid, semi-solid, hollow, fluid-filled or powder-filled, one-piece or multi-component cores. As used herein, the terms core and center are generally used interchangeably to reference the innermost component of the ball. In some embodiments, however, the term "center" is used when there are multiple core layers, i.e., a center and an outer core layer. The term "semi-solid" as used herein refers to a paste, a gel, or the like.

Any core material known to one of ordinary skill in that art is suitable for use in the golf balls of the invention. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. For example, butadiene rubber, which, in an uncured state, typically has a Mooney viscosity greater than about 20, preferably greater than about 30, and more preferably greater than about 40, may be used in one or more core layers of the golf balls prepared according to the present invention. Mooney viscosity is typically measured according to ASTM D1646-99. In addition, the IPNs of the present invention may also be incorporated into any component of a golf ball, including the core.

A free-radical source, often alternatively referred to as a free-radical initiator, may optionally be used in the core, or one or more layers of the golf balls according to the invention, particularly when a polymer component includes a thermoset material. The free-radical source for non-IPN components may be similar to that used in an IPN of the present invention or may be selected from the same or other suitable compounds.

The free radical source for non-IPN components is preferably a peroxide, more preferably an organic peroxide. The peroxide is typically present in an amount greater than about 0.1 parts per hundred of the total polymer component, preferably about 0.1 to 15 parts per hundred of the polymer component, and more preferably about 0.2 to 5 parts per hundred of the total polymer component. It should be understood by those of ordinary skill in the art that the presence of certain components may require a larger amount of free-radical source than the amounts described herein. The free radical source may alternatively or additionally be one or more of an electron beam, UV or gamma radiation, x-rays, or any other high energy radiation source capable of generating free radicals. It should be further understood that heat often facilitates initiation of the generation of free radicals when peroxides are used as a free-radical initiator.

Golf Ball Intermediate Layer(s)

When the golf ball of the present invention includes an intermediate layer, such as an inner cover layer or outer core layer, i.e., any layer(s) disposed between the inner core and the outer cover of a golf ball, this layer can include any materials known to those of ordinary skill in the art including thermoplastic and thermosetting materials. In one embodiment, the intermediate layer is formed, at least in part, from an IPN of the invention.

The intermediate layer(s) may also be formed, at least in part, from one or more homopolymeric or copolymeric materials, such as ionomers, primarily or fully non-ionomeric thermoplastic materials, vinyl resins, polyolefins, polyurethanes, polyureas, such as those disclosed in U.S. Pat. No. 5,484,870, polyamides, acrylic resins and blends thereof, olefinic thermoplastic rubbers, block copolymers of styrene and butadiene, isoprene or ethylene-butylene rubber, copoly (ether-amide), such as PEBAX, sold by Atofina Chemicals, Inc. of Philadelphia, Pa., polyphenylene oxide resins or blends thereof, and thermoplastic polyesters.

For example, the intermediate layer may be formed of low acid ionomers, such as those described in U.S. Pat. Nos. 6,506,130 and 6,503,156, high acid ionomers, highly neutralized polymers, such as those disclosed in U.S. Patent Publication Nos. 2001/0018375 and 2001/0019971, or mixtures thereof. The intermediate layer may also be formed from the compositions as disclosed in U.S. Pat. No. 5,688,191. The entire disclosures of these patents and publications are incorporated herein by express reference thereto.

The intermediate layer may also include a wound layer formed from a tensioned thread material. Many different kinds of thread materials may be used for the wound layer of the present invention. The thread may be single-ply or may include two or more plies. Preferably, the thread of the present invention is single-ply. The thread may be selected to have different material properties, dimensions, cross-sectional shapes, and methods of manufacturing. If two or more threads are used, they may be identical in material and mechanical properties or they may be substantially different from each other, either in cross-section shape or size, composition, elongated state, and mechanical or thermal properties. Mechanical properties that may be varied include resiliency, elastic modulus, and density. Thermal properties that may be varied include melt temperature, glass transition temperature and thermal expansion coefficient.

The tensioned thread material of the wound layer may encompass any suitable material, but typically includes fiber, glass, carbon, polyether urea, polyether block copolymers, polyester urea, polyester block copolymers, syndiotactic- or isotactic-poly(propylene), polyethylene, polyamide, poly(oxymethylene), polyketone, poly(ethylene terephthalate), poly(p-phenylene terephthalamide), poly(acrylonitrile), diaminodicyclohexylmethane, dodecanedicarboxylic acid, natural rubber, polyisoprene rubber, styrene-butadiene copolymers, styrene-propylene-diene copolymers, another synthetic rubber, or block, graft, random, alternating, brush, multi-arm star, branched, or dendritic copolymers, or mixtures thereof.

Threads used in the present invention may be formed using a variety of processes including conventional calendering and slitting, melt spinning, wet spinning, dry spinning and polymerization spinning. Any process available to one of ordinary skill in the art may be employed to produce thread materials for use in the wound layer. The tension used in winding the thread material of the wound layer may be selected as desired to provide beneficial playing characteristics to the final golf ball. The winding tension and elongation may be kept the same or may be varied throughout the layer. Preferably, the winding occurs at a consistent level of tension so that the wound layer has consistent tension throughout the layer.

In addition, the winding patterns used for the wound layer can be varied in any way available to those of ordinary skill in the art. Although one or more threads may be combined to begin forming the wound layer, it is preferred to use only a single continuous thread.

Golf Ball Cover(s)

The cover provides the interface between the ball and a club. Properties that are desirable for the cover are good moldability, high abrasion resistance, high impact resistance, high tear strength, high resilience, and good mold release, among others. The cover layer may be formed, at least in part, from an IPN of the invention.

When an IPN of the invention is incorporated into a core or intermediate/inner cover layer, the cover compositions may include one or more homopolymeric or copolymeric materials as discussed in the section above pertaining to the intermediate layer. The cover may also be at least partially formed from the polybutadiene reaction product discussed above with respect to the core.

As discussed elsewhere herein, the cover may be molded onto the golf ball in any known manner, such as by casting, compression molding, injection molding, reaction injection molding, or the like. One skilled in the art would appreciate that the molding method used may be determined at least partially by the properties of the composition. For example, casting may be preferred when the material is thermoset, whereas compression molding or injection molding may be preferred for thermoplastic compositions.

The golf balls of the present invention can likewise include one or more homopolymeric or copolymeric thermoplastic or thermoset materials in a center, an intermediate layer, and/or a cover, either individually or in combination with any other available materials or in a blend with any IPN according to the invention. In one embodiment, the one or more portions of the ball including IPN material will not include blends with conventional materials. One of ordinary skill in the art would know that most of the polymeric materials listed below may belong in the thermoplastic category or in the thermoset category, depending upon the nature of the repeat units, functional groups pendant from the repeat units, method of polymerization, method of formation, temperature of formation, post-polymerization treatments, and/or many other possible factors, and are suitable for use in golf balls according to the invention. The materials include, but are not limited to, the following polymers, or their set of monomeric, oligomeric, or macromonomeric precursors:

(1) Vinyl resins, for example, such as those formed by the polymerization of vinyl chloride, or by the copolymerization of vinyl chloride with vinyl acetate, acrylic esters or vinylidene chloride;

(2) Polyolefins, for example, such as polyethylene, polypropylene, polybutylene, and copolymers, such as ethylene methylacrylate, ethylene ethylacrylate, ethylene vinyl acetate, ethylene methacrylic acid, ethylene acrylic acid, or propylene acrylic acid, as well as copolymers and homopolymers, such as those produced using a single-site catalyst or a metallocene catalyst;

(3) Polyurethanes, for example, such as those prepared from diols, triols, or polyols and diisocyanates, triisocyanates, or polyisocyanates, as well as those disclosed in U.S. Pat. No. 5,334,673;

(4) Polyureas, for example, such as those prepared from diamines, triamines, or polyamines and diisocyanates, triisocyanates, or polyisocyanates, as well as those disclosed in U.S. Pat. No. 5,484,870;

(5) Polyamides, for example, such as poly(hexamethylene adipamide) and others prepared from diamines and dibasic acids, as well as those from amino acids such as poly(caprolactam), and blends of polyamides with SURLYN, polyethylene, ethylene copolymers, ethyl-propylene-non-conjugated diene terpolymer, and the like;

(6) Acrylic resins and blends of these resins with, for example, polymers such as poly vinyl chloride, elastomers, and the like;

(7) Olefinic rubbers, for example, such as blends of polyolefins with ethylene-propylene-non-conjugated diene terpolymer; block copolymers of styrene and butadiene, isoprene or ethylene-butylene rubber; or copoly(ether-amide), such as PEBAX, sold by ELF Atochem of Philadelphia, Pa.;

(8) Polyphenylene oxide resins or blends of polyphenylene oxide with high impact polystyrene, for example, as sold under the trademark NORYL by General Electric Company of Pittsfield, Mass.;

(9) Polyesters, for example, such as polyethylene terephthalate, polybutylene terephthalate, polyethylene terephthalate/glycol modified and elastomers, such as sold under the trademarks HYTREL by E.I. DuPont de Nemours & Co. of Wilmington, Del., and LOMOD by General Electric Company of Pittsfield, Mass.;

(10) Blends and alloys, for example including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene, ethylene vinyl acetate, or other elastomers;

(11) Blends of vulcanized, unvulcanized, or non-vulcanizable rubbers with polyethylene, propylene, polyacetal, nylon, polyesters, cellulose esters, and the like; and

(12) Polymers or copolymers possessing epoxy-containing, or post-polymerization epoxy-functionalized, repeat units, for example, in combination with anhydride, ester, amide, amine, imide, carbonate, ether, urethane, urea, α-olefin, conjugated, or acid (optionally totally or partially neutralized with inorganic salts), such as HPF-1000 and HPF-2000 commercially available from DuPont, comonomers, or copolymers or blends thereof.

Layer Formation

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacture methods are disclosed in U.S. Pat. Nos. 6,207,784 and 5,484,870, the disclosures of which are incorporated herein by reference in their entirety.

The cores of the invention may be formed by any suitable method known to those of ordinary skill in art. When the cores are formed from a thermoset material, compression molding is a particularly suitable method of forming the core. In a thermoplastic core embodiment, on the other hand, the cores may be injection molded. Furthermore, U.S. Pat. Nos. 6,180,040 and 6,180,722 disclose methods of preparing dual core golf balls. The disclosures of these patents are hereby incorporated by reference in their entirety.

The intermediate layer may also be formed from using any suitable method known to those of ordinary skill in the art. For example, an intermediate layer may be formed by blow molding and covered with a dimpled cover layer formed by injection molding, compression molding, casting, vacuum forming, powder coating, and the like. In one embodiment, the intermediate layer may be a moisture barrier layer as disclosed in U.S. Pat. No. 6,632,147. Thus, a golf ball of the invention may include an intermediate layer that has a moisture vapor transmission rate lower than that of the cover and, additionally, a primary ingredient of the intermediate layer is made from a material including polybutadiene, natural rubber, butyl-based rubber, acrylics, trans-polyisoprene, neoprene, chlorinated polyethylene, balata, multi-layer thermoplastic films, blends of ionomers, polyvinyl alcohol copolymer and polyamides, and dispersions of acid salts of polyetheramines.

The IPNs of the invention may be applied over an inner ball using a variety of application techniques such as spraying, compression molding, dipping, spin coating, casting, or flow coating methods that are well known in the art. In one embodiment, the IPNs are formed over the core using a combination of casting and compression molding. In addition, the IPNs may be formed around an inner ball using reaction injection molding (RIM) and liquid injection molding (LIM) techniques.

The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. The resultant golf balls prepared according to the invention typically will have dimple coverage greater than about 60 percent, preferably greater than about 65 percent, and more preferably greater than about 70 percent.

Golf Ball Post-Processing

The golf balls of the present invention may be painted, coated, or surface treated for further benefits. For example, golf balls may be coated with the IPNs of the invention in order to obtain an extremely smooth, tack-free surface. In addition to the IPNs of the invention, other coating materials, such as urethanes, urethane hybrids, epoxies, polyesters and acrylics, may be used for coating golf balls formed according to the invention. If desired, more than one coating layer can be used. The coating layer(s) may be applied by any suitable method known to those of ordinary skill in the art. In one embodiment, the coating layer(s) is applied to the golf ball cover by an in-mold coating process, such as described in U.S. Pat. No. 5,849,168, which is incorporated in its entirety by reference herein.

Golf Ball Properties

The properties such as core diameter, intermediate layer thickness and cover layer thickness, hardness, and compression have been found to effect play characteristics such as spin, initial velocity and feel of the present golf balls.

Component Dimensions

Dimensions of golf ball components, i.e., thickness and diameter, may vary depending on the desired properties. For the purposes of the invention, any layer thickness may be employed. For example, the present invention relates to golf balls of any size, although the golf ball preferably meets USGA standards of size and weight. While "The Rules of Golf" by the USGA dictate specifications that limit the size of a competition golf ball to more than 1.680 inches in diameter, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches (43 mm) to about 1.740 inches (44 mm) is most preferred, however diameters anywhere in the range of from 1.700 to about 1.950 inches can be used. Preferably, the overall diameter of the core and all intermediate layers is about 80 percent to about 98 percent of the overall diameter of the finished ball.

The core may have a diameter ranging from about 0.09 inches to about 1.65 inches. In one embodiment, the diameter of the core of the present invention is about 1.2 inches to about 1.630 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches. In one embodiment, the core diameter is about 1.59 inches or greater. In another embodiment, the diameter of the core is about 1.64 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. In one embodiment, the cover thickness is from about 0.02 inches to about 0.12 inches, preferably about 0.1 inches or less. In another embodiment, the cover thickness is about 0.05 inches or less, preferably from about 0.02 inches to about 0.05 inches, and more preferably about 0.02 inches and about 0.045 inches.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In another embodiment, the intermediate layer thickness is about 0.05 inches or less, more preferably about 0.01 inches to about 0.045 inches.

Hardness

The golf ball layers containing the IPNs according to the present invention typically have a material hardness greater than about 15 Shore A, preferably from about 15 Shore A to 85 Shore D. In one preferred embodiment, the material hardness of a golf ball layer including an IPN of the present invention is from about 10 to 85 Shore D. It should be understood, especially to one of ordinary skill in the art, that there is a fundamental difference between "material hardness" and "hardness, as measured directly on a golf ball." Material hardness is defined by the procedure set forth in ASTM-D2240-00 and generally involves measuring the hardness of a flat "slab" or "button" formed of the material of which the hardness is to be measured. Generally, ASTM-D2240-00 requires calibration of durometers, which have scale readings from 0 to 100. However, readings below 10 or above 90 are not considered reliable, as noted in ASTM-D2240-00, and accordingly, all the hardness values herein are within this range.

In particular, the cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

Compression

Compression values are dependent on the diameter of the component being measured. The Atti compression of the core, or portion of the core, of golf balls prepared according to the invention is preferably less than about 80, more preferably less than about 75. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball. In another embodiment, the core compression is from about 40 to about 80, preferably from about 50 to about 70. In yet another embodiment, the core compression is preferably below about 50, and more preferably below about 25.

In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 60 to about 100. In yet another embodiment, the compression of the golf balls of the invention is about 75 or greater and about 95 or less. For example, a preferred golf ball of the invention may have a compression from about 80 to about 95.

Coefficient of Restitution

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

Alternatively, the maximum COR of the ball is one that does not cause the golf ball to exceed initial velocity requirements established by regulating entities such as the USPGA. As used herein, the term "coefficient of restitution" (CoR) is calculated by dividing the rebound velocity of the golf ball by the incoming velocity when a golf ball is shot out of an air cannon. The COR testing is conducted over a range of incoming velocities and determined at an inbound velocity of 125 ft/s. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

Spin Rate

A spin rate of a golf ball refers to the speed it spins on an axis while in flight, measured in revolutions per minute ("rpm"). Spin generates lift, and accordingly, spin rate directly influences how high the ball flies and how quickly it stops after landing. The golf balls disclosed herein can be tested to determine spin rate by initially establishing test conditions using suitable control golf balls and golf clubs. For example, a spin rate of a golf ball struck by a standard golf driver was obtained by using test conditions for a Titleist Pinnacle Gold golf ball that gives a ball speed of about 159 to about 161 miles/hour, a launch angle of about 9.0 degrees to about 10.0 degrees, and a spin rate of about 2900 rpm to about 3100 rpm. Thus in one embodiment, the spin rate of a golf ball hit with a golf club driver under the same test conditions is between about 1200 rpm to about 4000 rpm. In a preferred embodiment, the spin rate of a golf ball hit with a golf club driver is between about 2000 rpm to about 3500 rpm, more preferably between about 2500 and 3000 rpm.

For an 8-iron ball spin test, a spin rate of a golf ball struck by a standard 8-iron club was obtained by using test conditions for a Titleist Pro VI golf ball that gives a ball speed of about 114 to about 116 miles/hour, a launch angle of about 18.5 to about 19.5 degrees and a spin rate of about 8100 rpm to about 8300 rpm. Thus in one embodiment, the spin rate of an average, cleanly struck 8-iron shot is between 6500 rpm and 10,000 rpm. In preferred embodiment, the spin rate of an average, cleanly struck 8-iron shot under the same test conditions is between 7500 rpm and 9500 rpm, more preferably between about 8000 rpm and 9000 rpm.

Moisture Vapor Transmission

The moisture vapor transmission of a golf ball portion formed from the compositions of the invention may be expressed in terms of absorption, e.g., weight gain or size gain over a period of time at a specific conditions, and transmission, e.g., moisture vapor transmission rate (MVTR) according to ASTM E96-00. MVTR refers to the mass of water vapor that diffused into a material of a given thickness per unit area per unit time at a specific temperature and humidity differential. For example, weight changes of a golf ball portion monitored over a period of seven weeks in 100 percent relative humidity and 72° F. help to demonstrate which balls have better water resistance. In one embodiment, the golf ball portions of the invention have a weight gain of about 0.15 grams or less after seven weeks. In another embodiment, the golf balls of the invention have a weight gain of about 0.13 grams or less after a seven-week storage period. In still another embodiment, the weight gain of the golf balls of the invention is about 0.09 grams or less after seven weeks. In yet another embodiment, the weight gain is about 0.06 grams or less after a seven-week period. The golf balls of the invention preferably have a weight gain of about 0.03 grams or less over a seven-week storage period.

Size gain may also be used as an indicator of water resistance. That is, the more water a golf ball takes on, the larger a golf ball becomes due to the water enclosed beneath the outermost layer of the golf ball portion. Thus, the golf balls of the invention preferably have no appreciable size gain. In one embodiment, the size gain of the golf balls of the invention after a seven-week period is about 0.001 inches or less.

MVTR of a golf ball, or portion thereof, may be about 2 g/(m2×day) or less, such as about 0.45 to about 0.95 g/(m2×day), about 0.01 to about 0.9 g/(m2×day) or less, at 38° C. and 90 percent relative humidity.

EXAMPLES

The following examples are only representative of the methods and materials for use in golf ball compositions and golf balls of this invention, and are not to be construed as limiting the scope of the invention in any way.

Example 1

Golf Ball Having a Urethane-Epoxy IPN Present in the Cover Layer

The golf ball of Example 1 was prepared with a 1.585 inch (about 4.03 cm) wound core around a fluid-filled center. The golf ball had a finished diameter of about 1.68 inches (about 4.27 cm). The golf ball of Example 1 included an IPN of a polyurethane and an epoxy polymer, wherein the epoxy polymer component was about 5 percent of the IPN and the polyurethane component was about 95 percent of the IPN. The urethane precursor package in Example 1 included Vibrathane B-821 prepolymer, 1,4-butanediol, and T-12 dibutyltin dilaurate catalyst. The molar proportion of isocyanate groups in the Vibrathane prepolymer to hydroxyl groups in the diol was in about a 1:0.95 ratio. The epoxy precursor package included an epoxy resin (DER 331) and a $BF_3$ catalyst/curing agent to facilitate self-polymerization and self-crosslinking to form an epoxy network. In order to limit the possibility of the polyurethane being further chain extended with the curing agent intended for curing the epoxy component, the epoxy curing agent was chosen to be catalytic and substantially unreactive with the polyurethane component. The epoxy curing agent chosen to prepare the ball of Example 1 was a $BF_3$:4-chlorobenzenamine catalyst complex. Other epoxy curing agents include, but are not limited to, oxides, such as magnesium oxide, or aluminum oxide; tertiary amines, such as N,N-dimethylaminopyridine, or benzyldimethylamine; imidazoles, such as 2-ethyl-4-methylimidazole; and phosphines, such as triphenylphosphine, or tributylphosphine.

The respective precursor packages were mixed separately until a sufficient viscosity was achieved to allow mixing by hand, or from about 8,000 cPs to 35,000 cPs, after which the precursor packages were mixed together and cast as the cover layer on wound cores to form the golf ball of Example 1. The total gelation time was about 80 seconds.

TABLE 1

| Cover/Ball Characteristics | Control | Example 1 |
|---|---|---|
| Urethane component BD precursor package | Vibrathane/BD (1:0.95) + 0.01 percent T-12 catalyst | Vibrathane/BD (1:0.95) + 0.01 percent T-12 catalyst (95 percent) |
| Epoxy component precursor package | — | DER 331/10 pph BF$_3$ catalyst (5 percent) |
| Coefficient of Restitution | 0.81 | 0.81 |
| Corrected Compression | 87 | 90 |
| Material Hardness (Shore D) | 38 | 31 |
| Cover Hardness (Shore D) | 46 | 43 |
| Initial Velocity (ft/sec) | 255.5 | 255 |
| $T_g$ peak (° C., measured by DSC) | −71 | −67 |
| $T_g$ width (° C., measured by DSC) | 17 | 24 |

Vibrathane is an isocyanate end-capped polyurethane prepolymer, in this case VIBRATHANE B-821, which is made from MDI and a 2,000 $M_N$ PTMEG polyol and is available commercially from Crompton Uniroyal Chemical Company, Inc., of Middlebury, Conn.; BD represents 1,4-butanediol, which is available commercially from BASF of Parsippany, N.J.; T-12 represents a dibutyl tin dilaurate catalyst, which is available commercially from Air Products of Allentown, Pa.; DER # 331 represents an epoxy resin based on a diglycidyl ether of bisphenol A (DGEBA) and is commercially available from Dow Chemical Company of Midland, Mich.; BF$_3$ catalyst represents a trifluoroboron-4-chlorobenzenamine catalyst complex and is commercially available from Air Products of Allentown, Pa.

Example 2

Golf Ball Having a Urethane-Polybutadiene Diacrylate IPN Present in the Cover Layer The golf ball of Example 2 includes an IPN of a polyurethane and a polybutadiene copolymer, which is prepared with a 1.585 inch (about 4.03 cm) wound core around a fluid-filled center. Note that the IPN's disclosed in the Examples and specification herein can be used in any golf ball construction. The golf ball has a finished diameter of about 1.68 inches (about 4.27 cm). The golf ball of Example 2 includes an IPN of a polyurethane and a polybutadiene diacrylate copolymer, wherein the polybutadiene copolymer component is about 10 percent of the IPN and the polyurethane component is about 90 percent of the IPN. The urethane precursor package in Example 2 includes Vibrathane B-821 prepolymer, 1,4-butanediol, and T-12 dibutyltin dilaurate catalyst. The molar proportion of isocyanate groups in the Vibrathane prepolymer to hydroxyl groups in the diol is in about a 1:0.95 ratio. The polybutadiene diacrylate copolymer precursor package includes butadiene monomer or a polybutadiene resin, a diacrylate crosslinking agent, and an initiator to facilitate crosslinking to form a polybutadiene diacrylate network. In order to limit the possibility of degradation of, or interference with, the polyurethane chain extension reaction, the polybutadiene diacrylate copolymer crosslinking initiator preferably is chosen to be substantially unreactive with the polyurethane. The initiator chosen to prepare the ball of Example 2 is a peroxide initiator, particularly dibenzoyl peroxide.

The respective precursor packages are mixed separately until a sufficient viscosity is achieved to allow mixing by hand, or from about 8,000 cPs to 35,000 cPs, after which the precursor packages are mixed together and cast as the cover layer on wound cores to form the golf ball of Example 2.

Example 3

Golf Ball Having a Urethane-Acrylate IPN Present in the Cover Layer

The golf ball of Example 3 is prepared with a 1.585 inch (about 4.03 cm) wound core around a fluid-filled center. Again, note that the IPN's disclosed in the Examples and specification herein can be used in any golf ball construction. The golf ball has a finished diameter of about 1.68 inches (about 4.27 cm). The golf ball of Example 3 includes an IPN of a polyurethane and an acrylate polymer, wherein the acrylate polymer component is about 10 percent of the IPN and the polyurethane component is about 90 percent of the IPN. The urethane precursor package in Example 3 includes Vibrathane B-821 prepolymer, 1,4-butanediol, and T-12 dibutyltin dilaurate catalyst. The molar proportion of isocyanate groups in the Vibrathane prepolymer to hydroxyl groups in the diol is in about a 1:0.95 ratio. The acrylate precursor package includes methyl methacrylate monomer, optionally a crosslinking agent (such as a diacrylate), and an initiator to facilitate polymerization (and optionally crosslinking) to form a methyl methacrylate polymer (and optionally network). In order to limit the possibility of degradation of, or interference with, the polyurethane chain extension reaction, the methyl methacrylate polymerization initiator is chosen to preferably be substantially unreactive with the polyurethane. The initiator chosen to prepare the ball of Example 3 is a free radical initiator, such as azobisisobutyronitrile (AIBN).

The respective precursor packages are mixed separately until a sufficient viscosity is achieved to allow mixing by hand, or from about 8,000 cPs to 35,000 cPs, after which the precursor packages are mixed together and cast as the cover layer on wound cores to form the golf ball of Example 3.

Example 4

Golf Ball Having a Urethane-Epoxy IPN Present in the Cover Layer

The golf ball of Example 4 is prepared with a 1.585 inch (about 4.03 cm) wound core around a fluid-filled center. Yet again, note that the IPN's disclosed in the Examples and specification herein can be used in any golf ball construction. The golf ball has a finished diameter of about 1.68 inches (about 4.27 cm). The golf ball of Example 4 includes an IPN of a polyurethane and an epoxy polymer, wherein the epoxy polymer component is about 10 percent of the IPN and the polyurethane component is about 90 percent of the IPN. The urethane precursor package in Example 4 includes Vibrathane B-821 prepolymer, 1,4-butanediol, and optionally a catalyst, such as T-12 dibutyltin dilaurate. The molar proportion of isocyanate groups in the Vibrathane prepolymer to hydroxyl groups in the diol is in about a 1:0.95 ratio. The epoxy precursor package includes an epoxy resin (DER 331), a $BF_3$ catalyst/curing agent to facilitate self-polymerization and self-crosslinking to form an epoxy network, and a catalyst to facilitate occasional interreactions of the urethane and the epoxy precursors or networks in the form of oxazolidone functional groups. In order to limit the possibility of the polyurethane being further chain extended with the curing agent intended for curing the epoxy component, the epoxy curing agent is chosen to preferably be catalytic and substantially unreactive with the polyurethane component. The epoxy curing agent chosen to prepare the ball of Example 4 is a $BF_3$:4-chlorobenzenamine catalyst complex. The oxazolidone formation catalyst chosen to prepare the ball of Example 4 is ethylmethyl imidazole.

The respective precursor packages are mixed separately until a sufficient viscosity is achieved to allow mixing by hand, or from about 8,000 cPs to 35,000 cPs, after which the precursor packages are mixed together and cast as the cover layer on wound cores to form the golf ball of Example 4.

Example 5

Electron Beam Cure of Polyurea Prepolymer/Urea Acrylate

Various mixtures containing polyurea prepolymer/curative and urea acrylate were cured using either electron beam radiation or thermal radiation and the DMA of resulting interpenetrating polymer networks were analyzed and compared with respect to their crosslink density. The curative in the polyurea prepolymer/curative mixture is CLEARLINK 1000, which can have a polyurea prepolymer/curative mixture ratio of between about 1:0.75 to about 1:1.25. The DMA results of the IPNs were obtained using a TA Instruments 2980 unit, using the following parameters: tensile film mode; 20 μm amplitude; 1 Hz frequency; 10 cNm clamping force; −100 to 250° C.; 3° C./min heating rate; and 15×6.5×0.6 (mm) sampling dimensions. The sample compositions are summarized below in Table 2 and the DMA results are summarized below in Table 3.

TABLE 2

| Sample ID | Amount of Polyurea Prepolymer/Clearlink 1000 (percent) | Amount of Urea Acrylate (percent) |
|---|---|---|
| 0 percent IPN | 100 | 0 |
| 10 percent IPN | 90 | 10 |
| 20 percent IPN | 80 | 20 |
| 30 percent IPN | 70 | 30 |
| 40 percent IPN | 60 | 40 |
| 100 percent IPN | 0 | 100 |

TABLE 3

| Sample ID | DMA Tg (° C.) Thermal Cure | Relative Crosslink density* (1000 moles/cc) Thermal Cure | DMA Tg (° C.) Before Radiation | DMA Tg (° C.) Radiation Cure | Relative Crosslink density* (1000 moles/cc) Radiation Cure |
|---|---|---|---|---|---|
| 0 percent IPN | −44° C., 80° C. | — | −50° C., 71° C. | −50° C., 73° C. | — |
| 10 percent IPN | −47° C., 81° C. | — | −42° C., 70° C. | −41° C., 74° C., 120° C. | — |
| 20 percent IPN | −46° C., 72° C., 135° C. | — | −48° C. | −50° C., 72° C., 104° C. | 0.01387 |
| 30 percent IPN | −46° C., 72° C., 131° C. | 0.00358 | −37° C., 43° C. | −42° C., 70° C., 111° C. | 0.0243 |
| 40 percent IPN | −46° C., 66° C., 121° C. | 0.0124 | — | −42° C., 66° C. | 0.058 |
| 100 percent IPN | −50° C., 73° C. | 0.83 | — | −42° C., 62° C. | 0.5588 |

*Relative crosslink density is a crosslink density in the sample as compared to 0 percent IPN crosslink density.

Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. For example, although the disclosure herein focuses on a method of making an IPN layer for golf balls, it is also easily applicable by one of ordinary skill in the art to the manufacture of other items, such as curing adhesives (e.g., in golf shoes), IPN coatings with crosslinkable systems, and in any application that requires post-crosslinking of the polymer. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball comprising a core and a cover, wherein a portion of the golf ball is formed from an interpenetrating polymer network comprising:
   a first polymeric system comprising a saturated isocyanate having terminal isocyanate groups, an amine-terminated component, and a blocked, delayed action curative; and
   a second polymeric system comprising an acrylate resin and an initiator.

2. The golf ball of claim 1, wherein the first polymeric system further comprises a catalyst comprising an organometallic compound, tertiary amine, or combination thereof.

3. The golf ball of claim 1, wherein the blocked delayed action curative comprises methylene dianiline and sodium chloride.

4. The golf ball of claim 1, wherein the initiator comprises benzoyl peroxide, t-amyl peroxide, or mixtures thereof.

5. The golf ball of claim 1, further comprising an intermediate layer.

6. The golf ball of claim 5, wherein the portion comprises the cover.

7. The golf ball of claim 1, wherein the blocked, delayed action curative has a deblocking temperature of about 175° F. to about 350° F.

8. A golf ball comprising a core and a cover, wherein the cover comprises an interpenetrating polymer network comprising:
   a first polymeric system comprising a saturated isocyanate having terminal isocyanate groups, an amine-terminated component, and a curing agent, wherein the curing agent comprises methylene dianiline and sodium chloride; and
   a second polymeric system comprising an acrylate resin and an initiator, wherein the first and second polymeric systems are not bonded to each other.

9. The golf ball of claim 8, wherein the initiator comprises benzoyl peroxide, t-amyl peroxide, or mixtures thereof.

* * * * *